United States Patent
Rudi et al.

(10) Patent No.: US 11,779,847 B2
(45) Date of Patent: *Oct. 10, 2023

(54) SYSTEMS AND METHODS FOR VERIFYING ACTIVITY ASSOCIATED WITH A PLAY OF A GAME

(71) Applicant: Sony Interactive Entertainment LLC, San Mateo, CA (US)

(72) Inventors: Olga Rudi, San Francisco, CA (US); Katrine Chow, San Mateo, CA (US); Jennifer Sheldon, San Francisco, CA (US); Miho Michigami, Foster City, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/945,068

(22) Filed: Sep. 14, 2022

(65) Prior Publication Data
US 2023/0020765 A1    Jan. 19, 2023

Related U.S. Application Data

(63) Continuation of application No. 17/067,540, filed on Oct. 9, 2020, now Pat. No. 11,458,404.

(51) Int. Cl.
| | | |
|---|---|---|
| *A63F 13/75* | (2014.01) | |
| *A63F 13/73* | (2014.01) | |
| *A63F 13/79* | (2014.01) | |
| *A63F 13/85* | (2014.01) | |

(52) U.S. Cl.
CPC ............ *A63F 13/75* (2014.09); *A63F 13/73* (2014.09); *A63F 13/79* (2014.09); *A63F 13/85* (2014.09)

(58) Field of Classification Search
None
See application file for complete search history.

(56) References Cited

U.S. PATENT DOCUMENTS

| | | | |
|---|---|---|---|
| 2008/0096663 A1* | 4/2008 | Lieberman | A63F 13/10 463/42 |
| 2008/0305869 A1* | 12/2008 | Konforty | G07F 17/3241 463/29 |
| 2009/0174702 A1* | 7/2009 | Garbow | G06Q 50/265 345/419 |
| 2010/0081508 A1* | 4/2010 | Bhogal | A63F 13/30 463/40 |
| 2017/0225079 A1* | 8/2017 | Conti | A63F 13/35 |
| 2017/0289133 A1* | 10/2017 | Yang | H04L 63/0815 |
| 2019/0270021 A1* | 9/2019 | Hume | A63F 13/87 |
| 2021/0038979 A1* | 2/2021 | Bleasdale-Shepherd | G07F 17/3225 |
| 2021/0370188 A1* | 12/2021 | Thomas | A63F 13/424 |

* cited by examiner

*Primary Examiner* — Jason T Yen
(74) *Attorney, Agent, or Firm* — Penilla IP, APC

(57) ABSTRACT

A method for verifying behavior associated with play of a game is described. The method includes receiving a characterization of a first player from a user account as being abusive and accessing a recording of the behavior of the first player stored for a pre-determined time period in response to receiving the characterization of the first player. The method further includes analyzing, by an artificial intelligence model, the behavior of the first player to determine whether the behavior is abusive. The operation of analyzing whether the behavior of the first player is abusive is performed to determine whether the characterization of the first player is accurate.

20 Claims, 15 Drawing Sheets

(No Game Console)

(Game Console)

SYSTEMS AND METHODS FOR VERIFYING ACTIVITY ASSOCIATED WITH A PLAY OF A GAME

CLAIM OF PRIORITY

The present patent application is a continuation of and claims the benefit of and priority, under 35 U.S.C. § 120, to U.S. patent application Ser. No. 17/067,540, filed on Oct. 9, 2020, and titled "Systems and Methods for Verifying Activity Associated With a Play of a Game", which is incorporated herein in its entirety for all purposes.

FIELD

The present disclosure relates to systems and methods for verifying activity associated with a play of a game.

BACKGROUND

In a multi-player game, there are multiple game players. Each player has a game console and accesses a network-based game from a server via the game console. Also, each player has a hand-held controller to play the game. For example, in a game Fortnite™, a first virtual character is controlled by a first gamer via a first hand-held controller and a second virtual character is controlled by a second gamer via a second hand-held controller. The first virtual character can be playing against the second virtual character, and therefore tries to eliminate the second virtual character. Similarly, the second virtual character tries to eliminate the first virtual character. When both the first and second virtual characters are in the same team, they help each other to win the multi-player game. However, during the play of the multi-player game, there can be abuse between the gamers.

It is in this context that embodiments of the invention arise.

SUMMARY

Embodiments of the present disclosure provide systems and methods for verifying activity associated with a play of a game.

In an embodiment, a method for verifying behavior associated with play of a game is described. The method includes receiving a characterization of a first player from a user account as being abusive and accessing a recording of the behavior of the first player stored for a pre-determined time period in response to receiving the characterization of the first player. The method further includes analyzing, by an artificial intelligence model, the behavior of the first player to determine whether the behavior is abusive. The operation of analyzing whether the behavior of the first player is abusive is performed to determine whether the characterization of the first player is accurate.

In one embodiment, a method for verifying behavior associated with play of a game is described. The method includes receiving a characterization of a first player from a user account as being praiseworthy and accessing a recording of the behavior of the first player stored for a pre-determined time period in response to receiving the characterization of the first player. The method further includes analyzing, by an artificial intelligence model, the behavior of the first player to determine whether the behavior is praiseworthy. The operation of analyzing whether the behavior of the first player is praiseworthy is performed to confirm that the characterization of the first player is praiseworthy.

In an embodiment, a server system for verifying behavior associated with play of a game is described. The server system includes a processor. The processor is configured to receive a characterization of a first player from a user account as being abusive. The processor is further configured to access a recording of the behavior of the first player stored for a pre-determined time period in response to receiving the characterization of the first player. The processor is configured to analyze, using an artificial intelligence model, the behavior of the first player to determine whether the behavior is abusive. The analysis is performed to determine whether the characterization of the player is accurate. The server system includes a memory device coupled to the processor.

Some advantages of the herein described systems and methods include determining an abusive behavior of a player. Upon receiving a report of abusive behavior by the player, the systems and methods apply an artificial intelligence (AI) model to confirm the abusive behavior. Upon confirming the abusive behavior, the systems and methods facilitate taking an appropriate action against the player. On the other hand, upon determining that the abusive behavior cannot be confirmed, the systems and methods do not execute any action against the player.

Also, additional advantages of the herein described systems and methods include determining a praiseworthy behavior of the player. In response to receiving a report of the praiseworthy behavior, the systems and methods described herein apply the AI model to confirm the praiseworthy behavior. Upon confirming the praiseworthy behavior, the systems and methods can reward the player with accolades. On the other hand, upon determining that the praiseworthy behavior cannot be confirmed, no action towards the player is executed by the systems and methods. In addition, because the AI model determines existence of the abusive or praiseworthy behavior, less time is taken by a game developer to review a large amount of data during a play of the game to decide whether the player is abusive or praiseworthy.

Additional advantages of the systems and methods described herein include controlling network traffic. Each network has a limited amount of bandwidth. If the limited amount of bandwidth is used inappropriately, such as by messages of abusive or inappropriate behavior, the bandwidth is wasted. The systems and methods determine whether the abusive behavior is being performed by the player and take appropriate action against the player to reduce further chances of the abusive behavior. This controls the network traffic and increases the network bandwidth. The network bandwidth is no longer wasted.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which.

DETAILED DESCRIPTION

Systems and methods for verifying activity associated with a play of a game are described. It should be noted that various embodiments of the present disclosure are practiced without some or all of these specific details. In other instances, well known process operations have not been described in detail in order not to unnecessarily obscure various embodiments of the present disclosure.

Figure 1A:
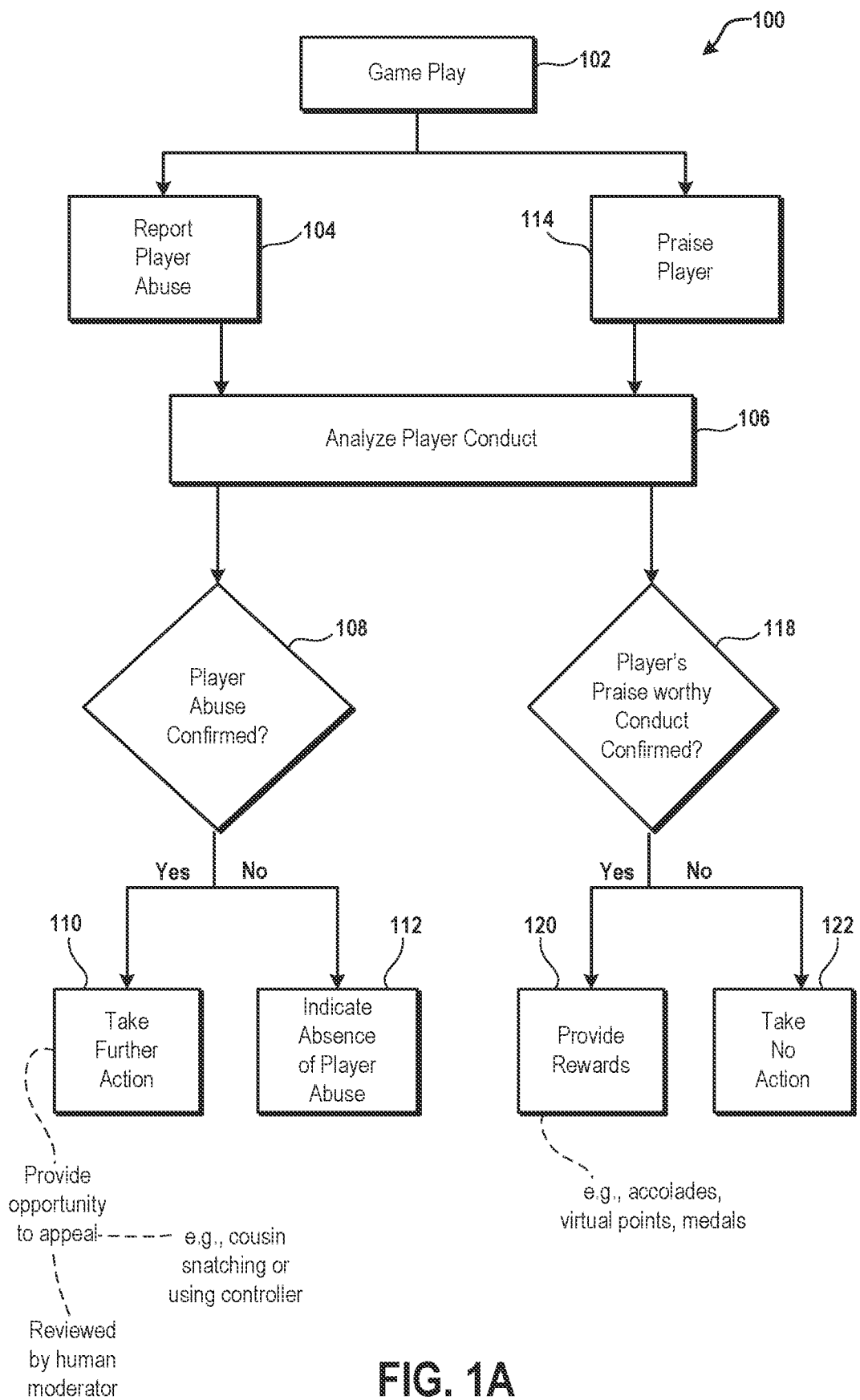
FIG. 1A is a flowchart of an embodiment of a method for determining abusive behavior by a player and determining praiseworthy conduct by the player.

FIG. 1A is a flowchart of an embodiment of a method 100 for determining abusive behavior by a player and determining praiseworthy conduct by the player. FIG. 1A is described with reference to a system 150 of FIG. 1B. The method 100 is executed by a server system 152, or by a computing device, or a combination thereof. Examples of the computing device include a game console, a head-mounted display (HMD), a desktop computer, a laptop computer, a tablet, a smart television, and a smart phone. The computing device is an example of a client device. Examples of the server system 152 include a cloud system. To illustrate, the server system 152 includes one or more servers, such as one or more nodes, and each server includes one or more processors and one or more memory devices. The one or more processors are coupled to the one or more memory devices. In this example, the functions, described herein, as being performed by the server system 152 are executed by one or more processors of the server system 152. The one or more processors of the server system 152 are parts of a processor system 159 and one or more memory devices of the server system 152 are parts of a memory system 160.

In the method 100, during an operation 102 of play of a game, by a player 1, a player 2 reports abuse by the player 1. The abuse by the player 1 is an example of a characterization of the player 1. The abuse is reported to the server system 152 in an operation 104 of the method 100. Examples of the game include a video game, a virtual reality (VR) game, and an augmented reality (AR) game. The video game can be a single player game or a multi-player game. The player 1 accesses the game via a user account 1 that is assigned to the player 1 by the server system 152. Similarly, the player 2 accesses the game via a user account 2 that is assigned to the player 2 by the server system 152. The operation 102 of playing the game occurs when the player 1 accesses the user account 1 to access the game from the server system 152. The game is accessed when a game code or a game program is executed by the server system 152. Also, the operation 102 of playing the game occurs when the player 2 accesses the user account 2 to access the game from the server system 152.

Examples of abuse by the player 1 include away from keyboard (AFK) behavior by the player 1, griefing by the player 1, spamming by the player 1, demeaning words provided by the player 1, derogatory comments made by the player 1, discriminatory comments made by the player 1, too many comments made by the player 1, helping an opposite team by the player 1, or being toxic towards other players of the game, or intentional feeding by the player 1, or violation of community rules by the player 1. As an illustration of the AFK behavior, when the players 1 and 2 are playing the game, the player 1 does not control a virtual character assigned to the player 1 to help the player 2 win the game. The player 1 can still be watching the game but does not control the virtual character. This can occur during one or many instances during the play of the game. As an illustration of griefing, the player 1 deliberately irritates and harasses other players within the video game, using features of the video game in unintended ways. In this illustration, the player 1 uses a chat feature 153 within the video game to provide demeaning or derogatory comments toward the player 2. As another illustration of griefing, the player 1 refuses to communicate with members of the same team as that of the player 1, participates in team fights, or refuses to help teammates. In a teamfight, the player 1 fights with the teammates. To further illustrate, the player 1 does not communicate with the player 2 of the same team as that of the player 1 via the chat feature 153 or a comment feature 154. In this illustration, the player 1 is requested help by the player 2 via the chat feature 153 or the comment feature 154, and the player 1 denies the request via the chat feature 153 or the comment feature 154. Also, in this illustration, the player 1 uses the chat feature 153 or the comment feature 154 to direct offensive words towards the player 2 to start a team fight. As yet another illustration of griefing, the player 1 deliberately does not act to help another player of the same team during the game. As such, there is intentional inaction on the part of the player 1.

As an illustration of being toxic, the player 1 uses the chat feature 153 or the comment feature 154 to harass the player 2, or 3, or 4. To further illustrate, the player 1 uses offensive words towards the players 2, or 3, or 4 or subjects the players 2, or 3, or 4 to aggressive pressure or intimidation. An illustration of intentional feeding includes the player 1 killing a virtual character controlled by the player 1 in the game on purpose so that an opposite team can win the game.

The processor system 159 of the server system 152 executes a chat program 164 to generate the chat feature 153. The chat program 164 is stored within the memory system 160. Examples of the chat program 164 include a video chat program that allows real-time video communication between two players, or an audio chat program that allows real-time audio communication between the two players, or a text chat program that allows real-time textual chat between the two players. As an illustration of too many comments made by the player 1, the player 1 posts comments, such as textual messages, or graphics, or animation, regarding the player 2 or on play of the game by the player 2 for greater than a pre-set number of times within a pre-set time period. The pre-set number of times and the pre-set time period are stored in the one or more memory devices of the memory system 160. The comments are posted using the chat feature 153 or using the comment feature 154 within the game. The processor system 159 executes a comment program 166 to generate the comment feature 154. The comment program 166 is stored within the memory system 160. As an illustration, the community rules are stored in the one or more memory devices of the server system 152. The community rules are created by a game developer of the game or by an entity that manufactures the computing device or by both the entities. The community rules are stored in the one or more memory devices of the server system 152.

As an example, the player 2 reports abuse using the comment feature 154 within the game. To illustrate, the player 2 accesses the game from the server system 152 after logging into the user account 2. Upon deciding that the player 1 is abusive, the player 2 accesses the comment feature 154 of the game by selecting a comment button displayed within the game. When the comment button is selected, a comment box or a comment field is displayed on a display device 2 of the client device 2, which is used by the player 2 for playing the game. In addition, when the comment button is selected, a user identifier (ID) field is displayed on the display device. The player 2 uses an input device 2 of the client device 2 to provide a user ID 1 of the player 1 in the user ID field. The user ID1 is a user ID that is used by the player 1 to log into the user account 1 to access the game. The user ID1 is unique to the player 1 and a user ID is different for each player of the game. Also, the uniqueness of the user ID1 is determined by the processor system 159. Also, the player 2 uses the input device 2 to provide comments in the comment box of the comment field describing or explaining the abusive behavior by the player 1. The input device 2 is associated with a client device 2 that is used by the player 2. The player 2 then selects a submit button using the input device 2 to submit the comments made within the comments field or comments box. When the submit button is selected, the comments are sent from the client device 2 via a computer network 156 to the server system 152. The server system 152 receives the comments from the client device 2 via the computer network 156.

As another example, the player 2 reports abuse using a report abuse button displayed within the game on a display screen of the client device 2. The player 2 uses the input device 2 to select the report abuse button. Upon receiving the selection of the report abuse button, the server system 152 displays the user ID field and the comment field or comment box to allow the player 2 to provide the comments regarding the user ID 1.

As yet another example, the player 2 reports abuse using a report abuse button of the game. The player 2 uses the input device 2 to select the report abuse button. Upon receiving the selection of the user ID1 and the report abuse button, the server system 152 displays the user ID field. Upon selection of the report abuse button and entry of the user ID 1 in the user ID field, an indication, such as a network signal, of the selection and the entry of the user ID 1 is generated by the client device 2 and sent via the computer network 156 to the server system 152. The processor system 159 receives the indication of the selection of the report abuse button and the user ID 1 via the computer network 156. Upon receiving the user ID 1 and the indication of the selection of the report praise button, the processor system 159 determines that the abusive conduct of the player 1 is reported. As an example, upon determining that the abusive conduct of the player 1 is reported, the processor system 159 titles the report as an abusive report, and stores the report in the memory system 160.

Examples of an input device, as used herein, include a keyboard, a mouse, a stylus, a keypad, a touchscreen, and a hand-held game controller. Examples of the hand-held game controller include a game controller that can be held using two hands or one hand of a player, such as a user. To illustrate, the game controller is a DualShock™ game controller available from Sony Corporation™. The hand-held game controller can be of a variety of shapes, such as a gun shape or a stick shape. Examples of a client device, as used herein, include the desktop computer, the tablet, the laptop computer, the HMD, the smart television, a combination of the game console and the HMD, a combination of a hand-held controller and the HMD, and a combination of the game console, the HMD, and the hand-held controller. Examples of a computer network, as used herein, include a local area network (LAN), a wide area network (WAN), and combination thereof. To illustrate, the computer network is the Internet, an intranet, or a combination thereof.

The server system 152 receives the comments and the user ID 1 of the player 1 from the user account 2 and the client device 2 via the computer network 156 and parses the comments to determine that the comments report the abusive behavior of the player 1. For example, the server system 152 identifies based on a comparison of the user ID 1 received from the client device 2 with a pre-stored user ID of the player 1 that the user ID 1 received is assigned to the player 1. Also, the server system 152 identifies based on a comparison of the comments with pre-stored words in a dictionary database and in a syntactical database that the comments report abuse by the player 1. The server system 152 analyzes a string of symbols within the comments and syntactic relationships between the string of symbols to determine that the comments report the abusive behavior of the player 1. To determine the abuse, the server system 152 can identify negative words, such as, abuse, harass, destructive, and annoying. Also, to determine the abuse, the server system 152 can look for syntactic relationships, such as, "destroyed my wall", or "killed me" or "my own team mate killed me" or "is abusive". As another example, the server system 152 receives the selection of the report abuse button and the user ID 1 via the computer network 156 and the user account 2 from the client device 2. The server system 152 further determines that the comments are received after the reception of the selection of the report abuse button and the user ID 1, and upon determining so, the server system 152 determines that the comments are regarding the abuse by the player 1. In this example, the server system 152 does not parse the comments to determine whether the player 2 is reporting abuse by the player 1. As yet another example, the server system 152 determines whether a selection of the report abuse button and the user ID 1 is received from the client device 2 via the computer network 156 for greater than a pre-determined number of times, such as one or two times. The selection of the report abuse button and the user ID 1 is received from the client device 2 after the player 2 logs into the user account 2. Upon determining that the selection of the report abuse button and the user ID 1 is received via the computer network 156 for more than the pre-determined number of times, the server system 152 determines that abusive behavior of the player 1 has been reported.

In the method 100, during the operation 102 of play of the game by the player 1, the player 2 praises conduct of the player 1. The praiseworthy conduct is reported to the server system 152 in an operation 114 of the method 100. For example, the player 2 believes that the player 1 is a good gaming citizen or a good actor, and reports the praiseworthy conduct of the player 1. Examples of the praiseworthy conduct by the player 1 include respectful comments by the player 1, a reasonable number of comments made by the player 1 during the play of the game, praiseworthy comments from the player 1 for the player 2 and/or other players, helping the player 2 and/or other players by the player 1 during the play of the game, or compliance with community rules by the player 1, or a combination thereof. As an illustration of the respectful comments, the player 1 provides positive feedback to the player 2 regarding game actions performed by the player 2 during the play of the game. The player 1 uses the features of the video game to follow the community rules. In this illustration, the player 1 uses the chat feature 153 or the comment feature 154 within the video game to provide constructive feedback to the player 2 regarding the game actions taken by the player 2. As an illustration of the reasonable number of comments made by the player 1, the player 1 posts comments regarding the player 2 or on play of the game by the player 2 for less than the pre-set number of times within the pre-set time period. The reasonable number of comments are posted using the chat feature 153 or using the comment feature 154 within the game.

As an example, the player 2 reports the praiseworthy conduct of the player 1 using the comment feature 154 within the game. To illustrate, the player 2 accesses the game from the server system 152 after logging into the user account 2. Upon deciding that the player 1 has performed the praiseworthy conduct, the player 2 accesses the comment feature 154 of the game by selecting the comment button displayed within the game. When the comment button is selected, the comment box or the comment field is displayed on the display device 2 of the client device 2. In addition, when the comment button is selected, the user ID field is displayed on the display device 2. The player 2 uses the input device 2 of the client device 2 to provide the user ID 1 of the player 1 in the user ID field. Also, the player 2 uses the input device 2 to provide comments describing or explaining the praiseworthy behavior of the player 1. The player 2 then selects a submit button using the input device 2 to submit the comments made within the comments field or comments box. When the submit button is selected, the comments are sent from the client device 2 via the computer network 156 to the server system 152. The server system 152 receives the comments from the client device 2 via the computer network 156.

As another example, the player 2 reports the praiseworthy conduct of the player 1 using a report praise button of the game. The player 2 uses the input device 2 to select the report praise button. Upon receiving the selection of the report praise button, the server system 152 displays the user ID field and the comment field or comment box to allow the player 2 to provide the comments regarding the user ID 1.

As yet another example, the player 2 reports the praiseworthy conduct using a report praise button of the game. The player 2 uses the input device 2 to select the report praise button. Upon receiving the selection of the report praise button, the server system 152 displays the user ID field. Upon selection of the report praise button and entry of the user ID 1 in the user ID field, an indication, such as a network signal, of the selection and the entry is generated by the client device 2 and sent via the computer network 156 to the server system 152. The server system 152 receives the indication of the selection of the report praise button and the user ID 1 via the computer network 156. Upon receiving the indication of the selection of the report praise button and the user ID 1, the server system 152 determines that the praiseworthy conduct of the player 1 is reported. As an example, upon determining that the praiseworthy conduct of the player 1 is reported, the processor system 159 titles the report as a praiseworthy report, and stores the report in the memory system 160.

The server system 152 receives the comments and the user ID 1 of the player 1 from the client device 2 via the computer network 156 and parses the comments to determine that the comments report the praiseworthy behavior of the player 1. For example, the server system 152 identifies based on a comparison of the comments with pre-stored words in a dictionary database and in a syntactical database that the comments report the praiseworthy conduct of the player 1. The server system 152 analyzes a string of symbols within the comments and syntactic relationships between the string of symbols to determine that the comments report the praiseworthy behavior of the player 1. To determine the praiseworthy conduct, the server system 152 can identify positive words, such as, awesome, great, nice, and cool. Also, to determine the praiseworthy behavior, the server system 152 can look for syntactic relationships, such as, "nice move", or "you helped me revive" or "you are an awesome teammate" or "you are an awesome friend" or "you are helpful" or "I am glad you were there". As another example, the server system 152 receives the selection of the report praise button and the user ID 1 via the computer network 156 from the client device 2. The server system 152 further determines that the comments are received after the reception of the selection of the report praise button, and upon determining so, the server system 152 determines that the comments are regarding the praiseworthy conduct. In this example, the server system 152 does not parse the comments to determine whether the player 2 is reporting the praiseworthy conduct of the player 1. As yet another example, the server system 152 determines whether a selection of the report praise button and the user ID 1 are received from the client device 2 via the computer network 156 for greater than a prestored number of times. The report praise button and the user ID 1 are received from the client device 2 after the player 2 logs into the user account 2. Upon determining that the selection of the report abuse button and the user ID 1 are received via the computer network 156 for more than the prestored number of times, the server system 152 determines that praiseworthy behavior of the player 1 has been reported.

In response to determining that the abusive conduct of the player 1 has been reported in the operation 104, the server system 152 executes an operation 106 of analyzing conduct of the player 1 based on the report received in the operation 104, based on a player profile of the player 1, and based on input data 312, described below, which is stored for a pre-determined time period or stored during a pre-determined number of one or more previous gaming sessions. As an example, upon receiving the report of the abuse, the server system 152 trains an artificial intelligence (AI) model based on the input data 312 stored regarding the conduct of the player 1 during game play of the game. Details of training of the AI model are provided below.

As an example, the pre-determined time period is a time interval that ranges from a time before the abuse by the player 1 is reported to the server system 152 in the operation 104 to a time after the abuse by the player 1 is reported. To illustrate, the pre-determined time period is an amount of time that ranges from a week or a month before the abusive conduct of the player 1 is reported to a week or a month after the abusive conduct of the player 1 is reported. As another example, the pre-determined time period is a time interval that ranges from a time at which the abuse by the player 1 is reported to a time after the abuse by the player 1 is reported. To illustrate, the pre-determined time period is an amount of time that ranges from a time at which the comments made by the player 2 regarding the player 1 to report abuse are received by the server system 152 until two weeks after the comments are received. As another illustration, the pre-determined time period is an amount of time that ranges from a time at which an indication of a selection of the report abuse button is received by the server system 152 until two weeks after the indication is received.

Also, upon receiving the report of the abusive behavior in the operation 104, the server system 152 accesses the player profile of the player 1 from a player profile database 158 to determine whether instances of abuse have been reported against the player 1 by additional players, such as a player 3 and a player 4. As an example, a player profile includes profile factors, such as a number of times abuse has been reported against a player, a number of accolades received by the player, a number of reports of praises regarding the player, a subscription level of the player, a number of virtual points accumulated by the player in the game, a number of times for which the AI model confirms that the player engages in abusive behavior, and a number of times for which the AI model confirms that the player engages in praiseworthy behavior. The player profile provides a snapshot of historical behavior of the player during play of the game.

Moreover, in response to determining that the praiseworthy conduct of the player 1 has been reported in the operation 114, the server system 152 executes the operation 106 of analyzing conduct of the player 1 based on the report received in the operation 114, based on a player profile of the player 1, and based on the input data 312. As an example, upon receiving the report of the praiseworthy conduct, the server system 152 trains the AI model based on the input data 312 stored regarding the conduct of the player 1 during game play of the game. Details of training of the AI model are provided below.

As an example, the pre-determined time period is a time interval that ranges from a time before the praiseworthy conduct of the player 1 is reported in the operation 114 to a time after the praiseworthy conduct of the player 1 is reported. To illustrate, the pre-determined time period is an amount of time that ranges from a fortnight or a month before the praiseworthy conduct of the player 1 is reported to a fortnight or month after the praiseworthy conduct of the player 1 is reported. As another example, the pre-determined time period is a time interval that ranges from a time at which the praiseworthy conduct of the player 1 is reported to a time after the praiseworthy conduct of the player 1 is reported. To illustrate, the pre-determined time period is an amount of time that ranges from a time at which the comments made by the player 2 regarding the player 1 to report the praiseworthy conduct are received by the server system 152 until five weeks after the comments are received. As another illustration, the pre-determined time period is an amount of time that ranges from a time at which the selection of the report praise button is received by the server system 152 until four weeks after the selection is received.

Also, upon receiving the report of the praiseworthy conduct in the operation 114, the server system 152 accesses the player profile of the player 1 from the player profile database 158 to determine whether instances of praiseworthy conduct have been reported for the player 1 by the additional players, such as the player 3 and the player 4. As an example, the player profile includes the profile factors, such as a number of instances of abuse by the player 1 as determined by the AI model and a number of instances of praiseworthy conduct by the player 1 as determined by the AI model.

In operations 108 and 118 of the method 100, a confirmation or determination of the conduct, such as the abusive conduct or the praiseworthy conduct, or a lack thereof is made based on the analysis of the conduct of the player 1 in the operation 106. The operation 108 is executed by the server system 152 to confirm or deny the report of abuse by the player 1 or confirm or deny an accuracy of the report of abuse by the player 1. Also, the operation 118 is executed by the server system 152 to confirm or deny the report of the praiseworthy conduct of the player 1 or confirm or deny an accuracy of the report of the praiseworthy behavior of the player 1. For example, the server system 152 applies a weight to the report of the abuse by the player 1 received in the operation 104, applies a weight to the report of the praiseworthy conduct of the player 1 received in the operation 114, applies weights to the profile factors associated with the player 1 to output weighted factors, and applies the weighted factors and the input data 312 to train the AI model to confirm or deny the abusive conduct by the player 1. The AI model is also trained in the operation 108 based on the input data 312 stored for the pre-determined time period or during the pre-determined number of one or more previous gaming sessions. To illustrate the operations 108 and 118, the server system 152 applies a weight Wn1 to the indication of the report of the abuse received via the computer network 156 from the client device 2, applies a weight Wn2 to the indication of the report of the praiseworthy conduct received via the computer network 156 from the client device 2, applies weights Wn3, Wn4, and so on until a weight Wnm to the profile factors, to output the weighted factors and applies the weighted factors and the input data 312 to train the AI model to determine a probability of abuse by the player 1, where Wnm is a real number, n is a positive integer, and m is a positive integer. Also, the weighted factors and the input data 312 are applied to train the AI model to determine a probability of the praiseworthy conduct by the player 1.

In the preceding example, the indication of the report of the abuse includes a number of times or instances for which the abuse is reported by the player 2 via the client device 2 and the user account 2. To illustrate, each time the player 2 selects a send button after describing the abuse via the chat feature 153 or the comment feature 154, the server system 152 increments an instance of report of the abuse by the player 1. In the example, the server system 152 calculates a total of the instances of report of the abuse. The server system 152 multiplies the total of the instances of report of the abuse with the weight Wn1 to output a first result. In this example, the indication of the praiseworthy conduct includes a number of times or instances for which the praiseworthy conduct is reported by the player 2 via the client device 2 and the user account 2. Each time the player 2 selects a send button after describing the praiseworthy conduct via the chat feature 153 or the comment feature 154, the server system 152 increments an instance of report of the praiseworthy conduct of the player 1. The server system 152 calculates a total of the instances of report of the praiseworthy conduct. The server system 152 multiplies the total of the instances of report of the praiseworthy conduct with the weight Wn2 to output a second result.

Also, continuing with the example, the server system 152 multiplies the weight Wn3 with a first profile factor to output a third result and the weight Wn4 with a second profile factor to output a fourth result. The server system 152 trains the AI model based on the first, second, third, and fourth results, and the input data 312 to output a final result of the training. An example of the final result includes a first combination of a first probability, greater than 50%, that the player 1 is abusive and a second probability, less than 50%, that the player 1 is praiseworthy. Another example of the final result is a second combination of a third probability, greater than 50%, that the player 1 is praiseworthy and a fourth probability, less than 50%, that the player 1 is abusive. Yet another example of the final result is a third combination of a fifth probability, equal to 50%, that the player 1 is abusive and the fifth probability, equal to 50%, that the player 1 is praiseworthy.

Upon determining that the probability that the player 1 is abusive is greater than the probability that the player 1 is praiseworthy, the server system 152 confirms or determines an existence of the abusive conduct of the player 1 and denies an existence of the praiseworthy conduct. Also, upon determining that the probability that the player 1 engages in the praiseworthy conduct is greater than the probability that the player 1 engages in the abusive conduct, the server system 152 confirms or determines an existence of the praiseworthy conduct of the player 1 and denies an existence of the abusive conduct. Upon determining that the probability that the player 1 engages in the abusive behavior is the same as the probability that the player 1 engages in the praiseworthy behavior, the server system 152 determines nonexistence of the praiseworthy conduct by the player 1 and nonexistence of the abusive conduct by the player 1.

It should be noted that as an example, all the weights Wn1 through Wnm are equal. As another example, each of the weights Wn1 through Wnm are different from each other. To illustrate, a lower weight is assigned to a first profile factor of the player 1 than a weight assigned to a second profile factor of the player 1. As another illustration, a lower weight is assigned to the report of the player abuse received in the operation 104 than weights assigned to the profile factors of the player 1. As yet another example, one or more but not all of the weights Wn1 through Wnm are equal to each other and remaining of the weights Wn1 through Wnm are different from each other and from the one or more of the weights Wn1 through Wnm.

Upon confirming or determining the abuse by the player 1 in the operations 108 and 118, in an operation 110 of the method 100, the server system 152 takes further action. For example, the server system 152 generates an indication of the abuse by the player 1, and sends the indication via the computer network 156 to the client device 1 for display within the user account 1. To illustrate, when the player 1 logs into the user account 1, the client device 1 displays a notification of the report of the abuse. The notification includes a user ID 2 of the player 2 who reported the abuse. The user ID 2 is assigned to the player 2 by the server system 152. The notification includes a text message, such as, "You have been reported as an abusive player" or "User ID2 has reported you as an abusive player". As another illustration, the notification of the report of the abuse does not include the user ID 2.

As another example, in addition to the indication of abuse by the player 1, the server system 152 provides an opportunity to the player 1 to appeal the report of abuse. To illustrate, the opportunity to appeal is provided by displaying an appeal button on a display device 1 of the client device 1. The opportunity to appeal is provided for a preset time interval. To illustrate, the server system 152 generates a text message, such as, "You can appeal this report", and sends the text message via the computer network 156 to the client device 1 for display within the user account 1. The player 1 can then appeal the report of abuse. The player 1 can select a display of the appeal button that is displayed within the game. Data for displaying the appeal button is generated by the server system 152. This selection of the appeal button is sent via the computer network 156 to the server system 152. Upon receiving a selection of the appeal button, the server system 152 generates data for displaying an explanation field, and sends the data via the computer network 156 to the client device 1. The player 1 uses an input device 1 of the client device 1 to provide an explanation within the explanation field. An example of the explanation includes that a cousin or a friend or an acquaintance of the player 1 snatched a hand-held controller from the player 1 and became abusive during the play of the game. When the player 1 selects a submit button after providing the explanation, data regarding the explanation is sent from the client device 1 via the computer network 156 to the server system 152 for storage in the reviewer account, which is assigned to a human reviewer.

The human reviewer, such as a human moderator, uses an administrator client device to access the explanation from the server system 152 via the reviewer account, reviews the explanation and decides whether to agree with the explanation. The human reviewer can be an employee of an entity that manufactures the client devices 1 and 2 or an entity that creates the game or an entity that manages the server system 152 or an entity that owns the server system 152. Upon determining to agree with the explanation, the human reviewer uses the administrator client device that is coupled to the server system 152 via the computer network 156 to generate a response, such as a notification indicating that the player 1 is not abusive or a notification indicating that the report of abuse is inaccurate or a notification indicating that there will be no action taken against the player 1 or a combination thereof, and provides the response to the reviewer account. The response is sent from the reviewer account of the server system 152 via the computer network 156 to the user account 1 for display on the client device 1 for review by the player 1. For example, the server system 152 does not cancel the user account 1. On the other hand, upon deciding to disagree with the explanation, the human reviewer controls the administrator client device to generate a reply, such as a notification to take further action against the player 1 or to cancel the user account 1 or prohibit game play by the player 1 or a combination thereof, and provides the reply to the reviewer account. The reply is sent from the reviewer account of the server system 152 via the computer network 156 to the user account 1. The player 1 uses the client device 1 to access the reply via the user account 1.

Also, on the other hand, in case the report of the abusive conduct of the player 1 is received in the operation 104, upon not confirming the abuse by the player 1 in the operations 108 and 118, the server system 152 executes an operation 112 of indicating an absence of abuse by the player 1. For example, the server system 152 generates a message indicating to the player 2 that the report of abuse has not been confirmed, and sends the message via the computer network 156 to the client device 2 for display within the user account 2. When the player 2 logs into the user account 2, the player 2 reviews the message displayed on the display device 2. As another example, in addition to generating the message indicating to the player 2 that the report of abuse has not been confirmed, the server system 152 applies the operations 106, 108, and 118 to the user account 2 to determine whether the player 2, who reported the player 1 as abusive, is abusive. To illustrate, the player 2 can report abuse of other players and the reporting of abuse is an indication of abuse by the player 2 during the play of the game. Upon determining that the player 2 is abusive, the server system 152 can take further action, as described in the operation 110, against the player 2. On the other hand, upon determining that the player 2 is not abusive, the server system 152 does not take the further action. It should be noted that the lack of confirmation of abuse by the player 1 is an example of denying that the report of abuse by the player 1 is accurate.

Upon confirming the praiseworthy conduct or determining an existence of the praiseworthy conduct of the player 1 in the operations 108 and 118, in an operation 120 of the method 100, the server system 152 provides rewards to the player 1, or sends a message to the player 1 regarding the praiseworthy conduct, or a combination thereof. For example, the server system 152 generates an indication of the praiseworthy conduct of the player 1, and sends the indication via the computer network 156 to the client device 1 for display within the user account 1. To illustrate, when the player 1 logs into the user account 1, the client device 1 displays a notification of the report of the praiseworthy conduct. The notification includes the user ID 2 of the player 2 who reported the praiseworthy conduct. The notification includes a text message, such as, "You have been reported as a praiseworthy player" or "User ID2 has reported you as a praiseworthy player". As another illustration, the notification of the report of the praiseworthy conduct does not include the user ID 2. As another example, in addition to the indication of the praiseworthy conduct, the server system 152 provides the rewards, such as accolades or virtual points or virtual medals or a combination thereof to the user account 1 assigned to the player 1. To illustrate, when the player 1 logs into the user account 1, the rewards are displayed on the display device 1 of the client device 1. The rewards can be highlighted by the server system 152. Examples of highlights include rendering the rewards in a bold format, or in a different color than a background of a virtual scene of the game, or a combination thereof.

Also, on the other hand, in case the report of the praiseworthy conduct of the player 1 is received in the operation 114, upon not confirming, in the operations 108 and 118, the abusive conduct and the praiseworthy conduct of the player 1, the server system 152 executes an operation 122 of inaction. For example, the server system 152 does not generate and add the rewards to the user account 1, and does not post the message to the user account 1 regarding the praiseworthy conduct of the player 1. As another example, the server system 152 generates a message indicating to the player 2 that the report of the praiseworthy conduct has not been confirmed, and sends the message via the computer network 156 to the client device 2. When the player 2 logs into the user account 2, the player 2 reviews the message displayed on the display device 2. It should be noted that the lack of confirmation of the praiseworthy conduct by the player 1 is an example of denying that the report of praiseworthy conduct of the player 1 is accurate.

In one embodiment, the processor system 159 hides information regarding flagging activities, such as reporting activities, among the players. For example, the processor system 159 hides a number of reports of abuse among the players, or a number of reports of praiseworthy conduct among the players, or a combination thereof. To illustrate, the processor system 159 does not include the number of reports of abuse against the player 1, or the number of reports of praiseworthy conduct of the player 1, or a combination thereof in the player profile of the player 1. In this illustration, the player 2, 3 or 4 cannot access the profile of the player 1 to view the number of reports of abuse against the player 1, or the number of reports of praiseworthy conduct of the player 1, or a combination thereof. The players 2 through 4 cannot log into their corresponding user accounts 2 through 4 and access the player profile of the player 1 to access the number of reports of abuse against the player 1, or the number of reports of praiseworthy conduct of the player 1, or a combination thereof. The display devices 2 through 4 used by the players 2 through 4 do not display the number of reports of abuse against the player 1, or the number of reports of praiseworthy conduct of the player 1, or a combination thereof. As another illustration, the number of reports of abuse against the player 1, or the number of reports of praiseworthy conduct of the player 1, or a combination thereof is not made available as public information by the processor system 159. The hiding of the flagging activities among the players reduces chances of group abuse against the player 1. In group abuse, the player 1 is targeted as an abuser by many players when the player 1 is not an abuser. For example, multiple players, such as the players 3 and 4, report the player 1 as being abusive when another player, such as the player 2, reports the player 1 as being abusive. This is an example of group abuse. When the profile of the player 1 does not include the indication, such as a report, of the abusive behavior, received from the player 2, the players 3 and 4 cannot access the indication on their client devices 3 and 4, and chances of negative bias, e.g., reports of abuse, against the player 1 by the players 3 and 4 are reduced.

In an embodiment, the processor system 159 hides the information regarding flagging activities against the player 1 when the processor system 159 determines that the player 1 is not abusive. For example, upon determining that the report of the abuse by the player 1 is not confirmed in the operation 108, the processor system 159 determines to delete an indication of the report of the abuse within the player profile of the player 1. To illustrate, upon receiving the report of abuse in the operation 104, the processor system 159 increments a count of a number of reports of abuse by one within the profile of the player 1. In response to determining, in the operation 108, that the report of abuse received in the operation 104 is not confirmed, the processor system 159 decrements the count by one. This reduces chances of group abuse of the player 1 by other players, such as the players 2 through 4.

In one embodiment, the processor system 159 includes a counter that counts a number of reports of the abusive behavior by the player 1 and counts a number of reports of the praiseworthy behavior by the player 1. In an embodiment, the processor system 159 is coupled to the counter. The counter counts a number of reports of the abusive behavior by the player 1 to generate a first count and counts a number of reports of the praiseworthy behavior by the player 1 to generate a second count, and sends the first and second counts to the processor system 159.

Figure 1B:
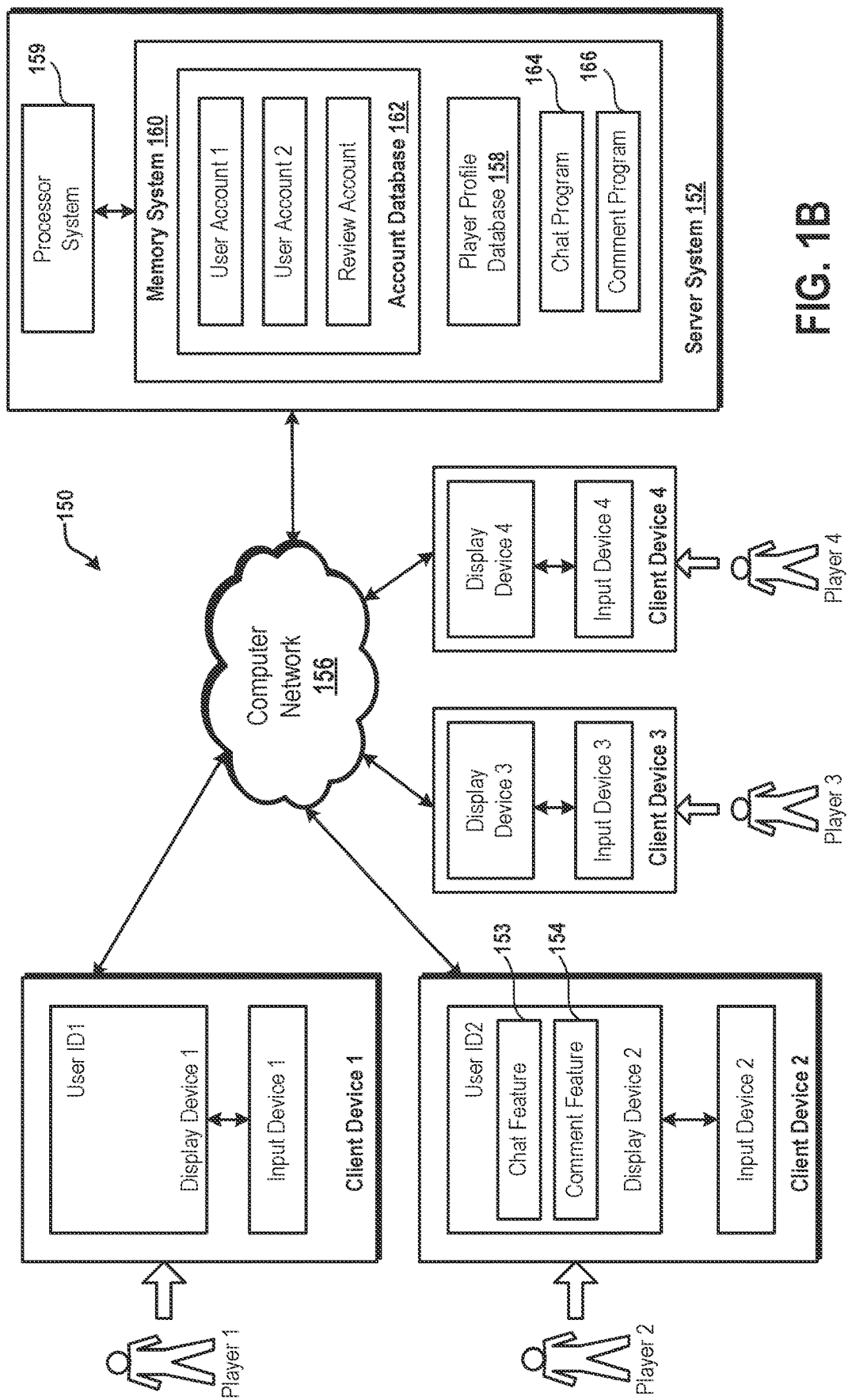
FIG. 1B is a diagram of an embodiment of a system to illustrate the method of FIG. 1A.

FIG. 1B is a diagram of an embodiment of the system 150 to illustrate the method 100 of FIG. 1A. The system 150 includes the client devices 1 and 2, the computer network 156, and the server system 152. The server system 152 includes the processor system 159 and the memory system 160. An example of a processor system, as used herein, includes one or more processors that are coupled to each other. Examples of a processor, as used herein, includes a processor of a server blade, an application specific integrated circuit (ASIC), a programmable logic device (PLD), a microprocessor, and a central processing unit (CPU). Examples of a memory system, as used herein, include one or more memory devices that are coupled to each other. Examples of a memory device, as used herein, include a read-only memory (ROM) and a random access memory (RAM). To illustrate, the memory system is a redundant array of independent disks (RAID). As another illustration, the memory device is a flash memory.

The memory system 160 includes an account database 162 and the player profile database 158. Within the account database 162, the user accounts 1 and 2 and a reviewer account are stored, and within the player profile database 158, profiles of the players 1 and 2 are stored. As an example, a player profile of the player includes a username of the player and the profile factors, such as a number of virtual points accumulated by the player over time during the pre-determined number of one or more previous game sessions of the game and a number of rewards received by the player. The player profile can include personal information regarding the player, such as a birth date, an age, a gender, and a real name of the player.

A user account of a player is accessed by the player when the player provides login information to the server system 152 and the login information is authenticated by the server system 152. For example, the player provides a username and a password on a login virtual page that is generated by the server system 152 for display on a client device. Upon receiving the login information, the server system 152 compares the login information with pre-stored login information to determine whether the login information received is authentic. Upon determining that the login information is authentic, the player is allowed access to a user account assigned to the player and to the game. On the other hand, in response to determining that the login information is not authentic, the player is not allowed access to the user account and to the game for game play. Each feature of the game, such as the chat feature 153 and the comment feature 154, is accessed after logging into the user account, and is associated with the user account.

Each client device, as used herein, includes a display device. Examples of the display device, as used herein, include a liquid crystal display (LCD) device, a light emitting diode (LED) display device, and the plasma display device. The display device can be a part of the desktop computer, the tablet, the laptop computer, the smartphone, the head-mounted display, and the smart television.

The player 3 uses a client device 3, which includes an input device 3 and a display device 3. The input device 3 is coupled to the display device 3. Also, the player 4 uses a client device 4, which includes an input device 4 and a display device 4. The input device 4 is coupled to the display device 4.

Figure 2A:
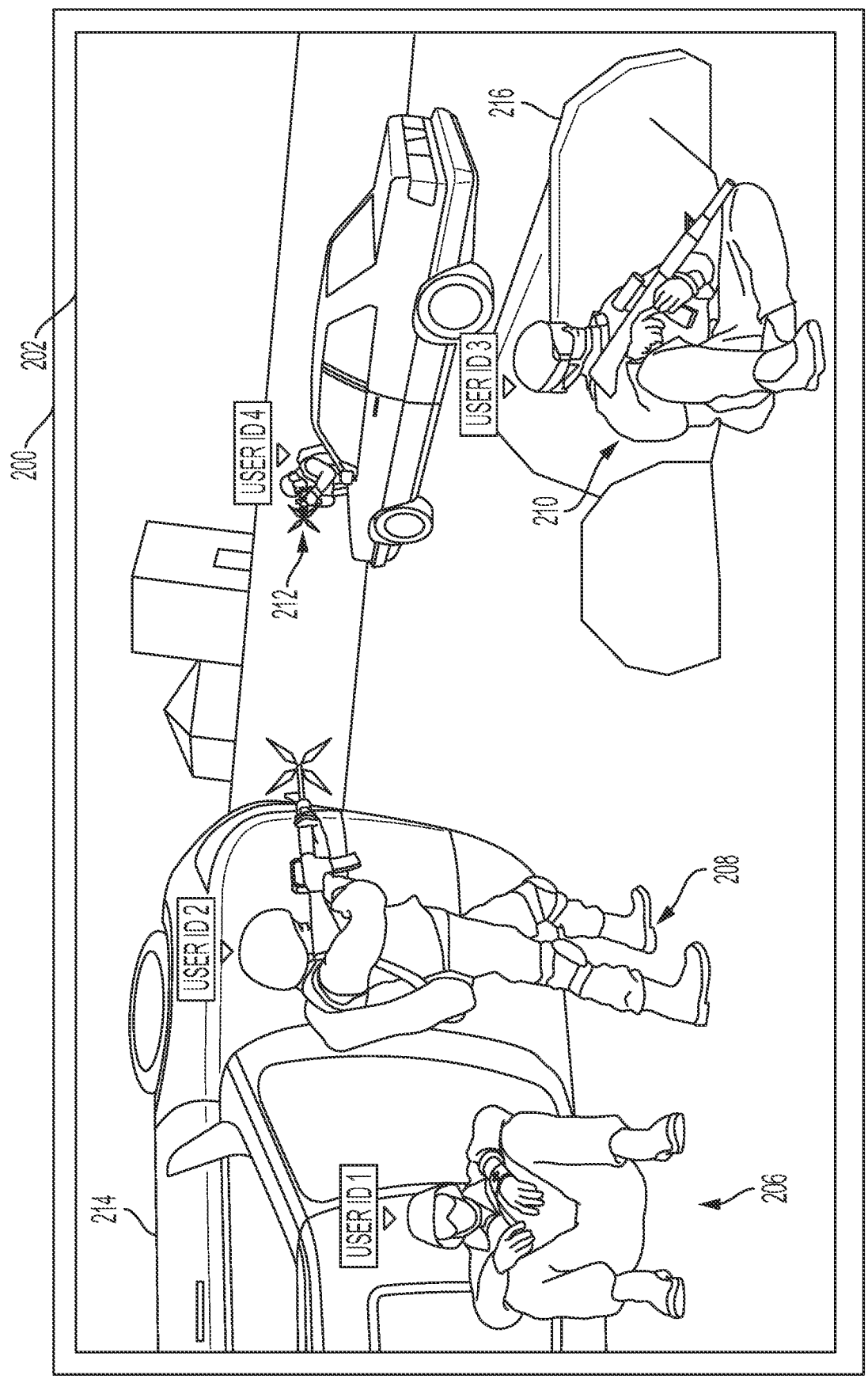
FIG. 2A is a virtual scene displayed on a display screen of a client device.

FIG. 2A is a virtual scene 202 displayed on a display screen of a client device 200. The client device 200 is an example of the client device 1 or 2 (FIG. 1B). Examples of the display screen include an LCD screen, an LED display screen, and a plasma display screen. The virtual scene 202 is of the game that is played by the players 1 through 4. In the virtual scene 202, a virtual character 206, who is linked to the user ID 1 by the server system 152 (FIG. 1B) is displayed. Moreover, another virtual character 208, who is linked to the user ID 2 by the server system 152 is displayed. Also, another virtual character 210, who is linked to a user ID 3 by the server system 152 is displayed and another virtual character 212, who is linked to a user ID 4 by the server system 152 is displayed. The user ID 3 is assigned by the server system 152 to the player 3 and the user ID 4 is assigned by the server system 152 to the player 4.

The virtual character 206 is controlled by the player 1 via the input device 1 (FIG. 1B). For example, the player 1 uses the input device 1 to log into the user account 1 and accesses the game. The player 1 selects the virtual character 206 from a variety of virtual characters, and controls movement of the virtual character 206 via the input device 1 to play the game. To illustrate, the player 1 presses a button on the hand-held controller of the client device 1 to control the virtual character 206 to operate a virtual gun to shoot at the virtual character 212. Similarly, the virtual character 208 is controlled by the player 2 via the input device 2 (FIG. 1B) of the client device 2, the virtual character 210 is controlled by the player 3 (FIG. 1B) via the input device 3 (FIG. 1B) of the client device 3, and the virtual character 212 is controlled by the player 4 (FIG. 1B) via the input device 4 (FIG. 1B) of the client device 4.

During play of the game, virtual characters 206 and 208 are hiding behind a virtual vehicle 214 and the virtual character 210 is hiding behind a virtual rock 216. The virtual character 212 uses a virtual gun to shoot at the virtual character 208. At the same time, the virtual character 208 uses a virtual gun to shoot back at the virtual character 212. While the virtual character 208 is shooting back at the virtual character 212, the virtual character 206 that is injured is putting on a virtual bandage on its forearm.

It should be noted that the virtual characters 206 and 208 are in the same team within the game. For example, before playing the game, the player 1 selects a team A button displayed within the game on the display device 1 (FIG. 1B). Also, the player 2 selects the same team A button displayed within the game on the display device 2 (FIG. 1B). When the selections of the team A are sent from the client devices 1 and 2 via the computer network 156 to the server system 152, both the players 1 and 2 are registered by the server system 152 to play for the same team A in the game.

Also, the virtual character 212 is in an opposite team B within the game. For example, before playing the game, the player 4 selects the team B button displayed within the game on the display device 4 (FIG. 1B). When the selection of the team B is sent from the client device 4 via the computer network 156 to the server system 152, the player 4 is registered by the server system 152 to play for the team B in the game.

The virtual character 210 is solo within the game. For example, before playing the game, the player 3 does not select to be on the team A or on the team B displayed within the game on the display device 3 (FIG. 1B). Without receiving a selection from the player 3 of the team A or the team B, the player 3 is registered by the server system 152 to be independent without belonging to any of the teams A and B in the game.

Figure 2B:
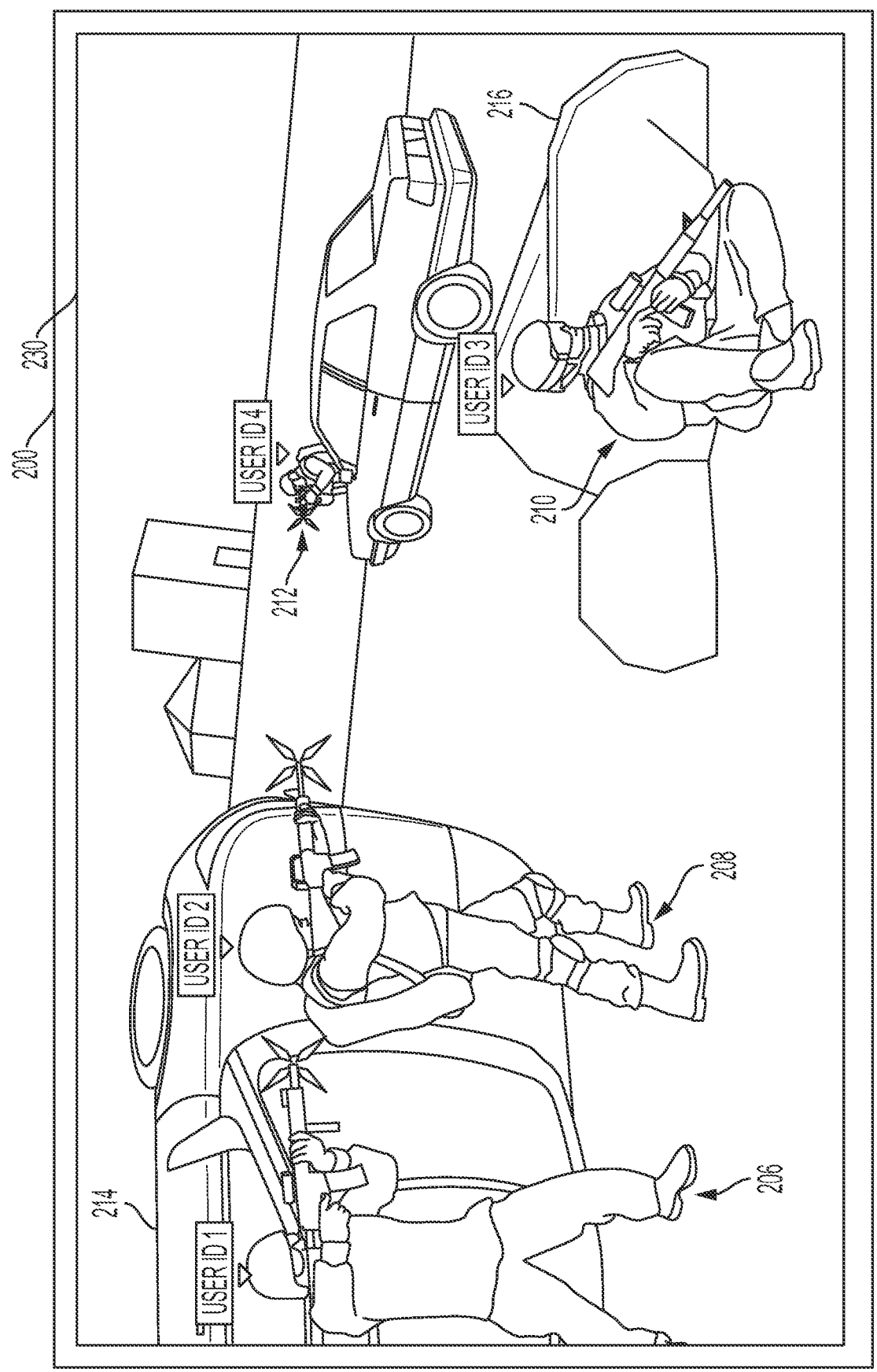
FIG. 2B is an embodiment of a virtual scene that is displayed on the display screen of the client device to illustrate that a first virtual character shoots a second virtual character, which is on the same team as that of the first virtual character.

FIG. 2B is an embodiment of a virtual scene 230 that is displayed on the display screen of the client device 200 to illustrate that the virtual character 206 shoots the virtual character 208, who is on the same team as that of the virtual character 206. For example, during the play of the game, the player 1 uses the input device 1 to control the virtual character 206 to further control the virtual gun held by the virtual character 206 to shoot at the virtual character 208. Shooting at the virtual character 208, who is in the same team, by the virtual character 206 is an example of an act of abuse by the player 1.

Figure 2C:
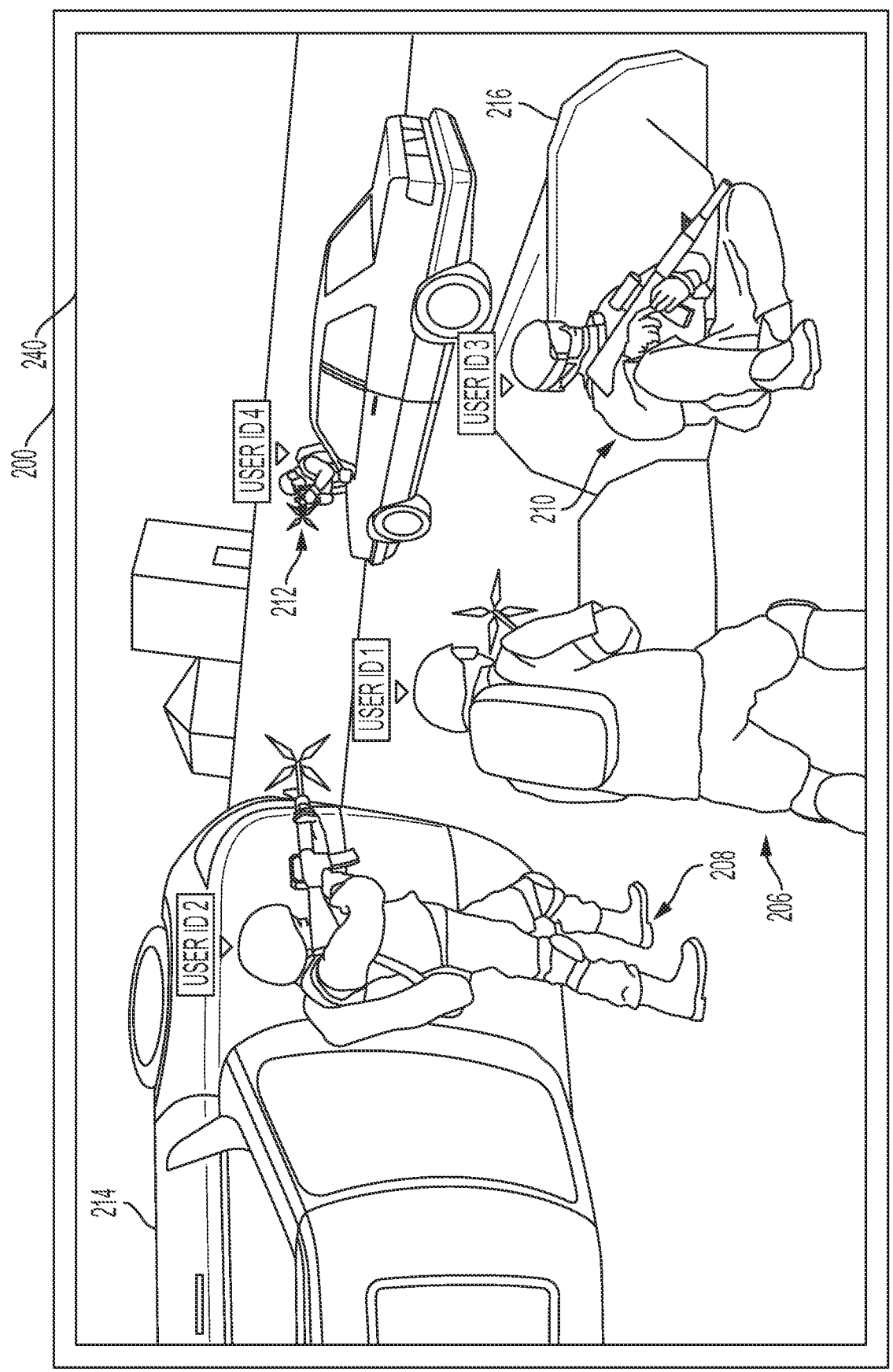
FIG. 2C is an embodiment of a virtual scene displayed on the display screen of the client device to illustrate that the first virtual character helps a third virtual character, which is solo and does not belong to any team.

FIG. 2C is an embodiment of a virtual scene 240 displayed on the display screen of the client device 200 to illustrate that the virtual character 206 helps the virtual character 210, who is solo and does not belong to any team. Also, in the virtual scene 240, the virtual character 206 helps the virtual character 208. The player 1 controls the virtual character 206 via the input device 1 to move from a defensive and safe location behind the virtual vehicle 214 to come in a line of fire of the virtual gun held by the virtual character 212. The virtual character 206 is controlled to move towards a location of the virtual character 210. While the virtual character 206 is moving, the virtual character 206 shoots at the virtual character 212 to help the virtual character 208 in defeating the team B. Also, the virtual character 206 succeeds in reaching the location of the virtual character 210 to help the virtual character 210, which is injured and has a low amount of virtual health. Shooting at the virtual character 212 is an example of the praiseworthy conduct by the player 1 during the play of the game. Also, helping the virtual character 210 is an example of the praiseworthy conduct by the player 1 during the play of the game.

Figure 3A:
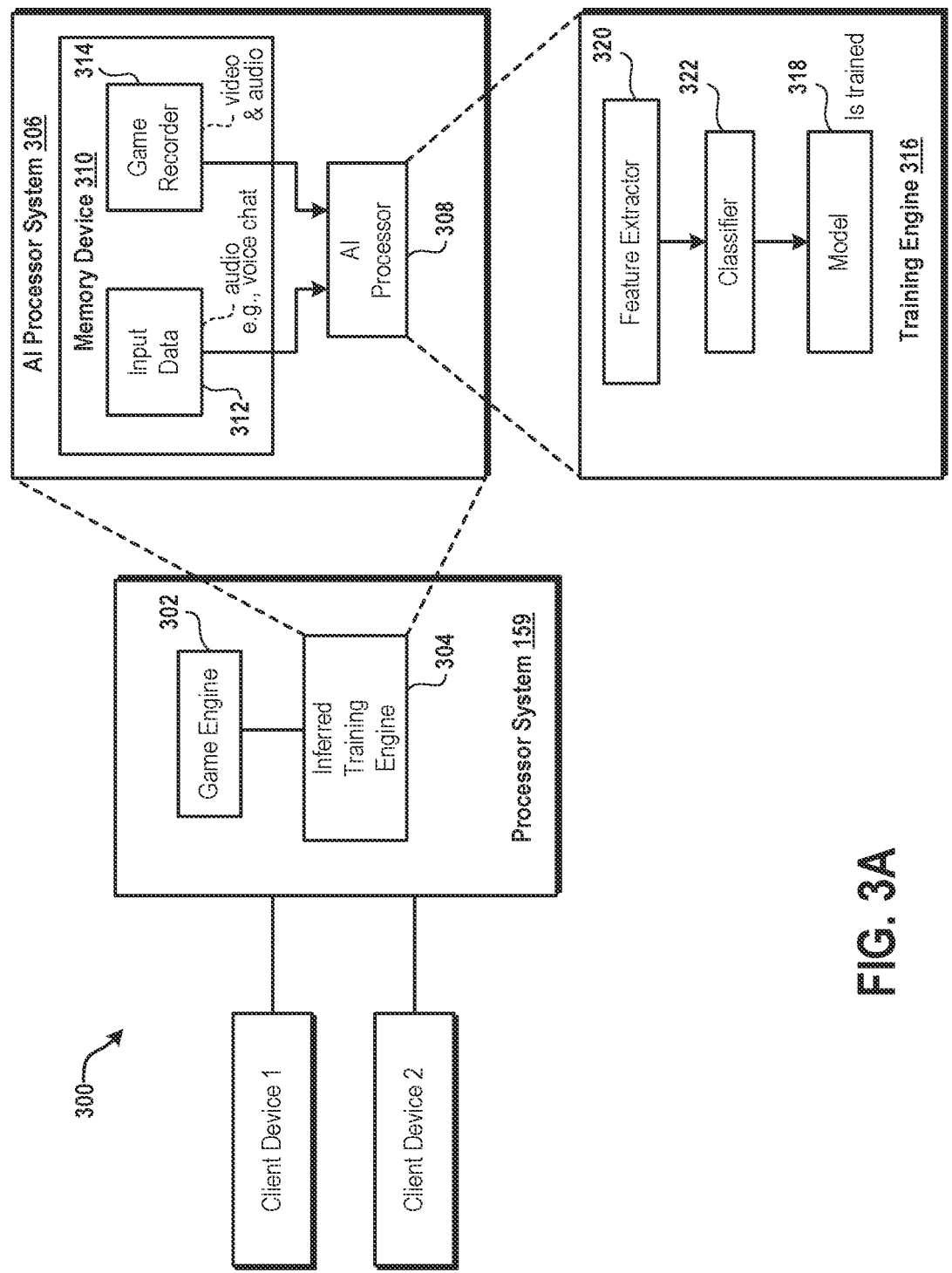
FIG. 3A is a diagram of an embodiment of a system to illustrate training of an artificial intelligence (AI) model.

FIG. 3A is a diagram of an embodiment of a system 300 to illustrate training of the AI model. The system 300 includes the client devices 1 and 2, and the processor system 159. The processor system 159 includes a game engine 302 and an inferred training engine 304. As an example, an engine, as used herein, includes a code, such as a software program or computer program instructions. As another example, an engine, as used herein, is a combination of the code and hardware for executing the code. To illustrate, the engine is a microprocessor for executing the code. As yet another example, an engine, as used herein, is the hardware in which the code is implemented. To illustrate, the engine is a field programmable gate array (FPGA) or a programmable logic device (PLD). An example of the game engine 302 includes a physics engine and a graphics engine. The physics engine applies the laws of physics to determine locations and orientations of each virtual character within a virtual scene of the game based on one or more input signals received from one or more of the client devices 1 and 2. The graphics engine determines graphics, such as colors, intensities, textures, of a virtual background and of each virtual character in a virtual scene.

The inferred training engine 304 is coupled to the game engine 302 and trains the AI model. The inferred training engine 304 is illustrated as an AI processor system 306. The AI processor system 306 includes an AI processor 308 and a memory device 310. The AI processor 308 is coupled to the memory device 310.

The AI processor 308 receives the weighted factors and the input data 312, such as video data, graphics data, animation data, textual data, and audio data. For example, the AI processor 308 receives the input data 312, which includes textual data of a chat between two players, such as the players 1 and 2 or the players 1 and 3 or the players 1 and 4, and/or comments made between the two players. The textual data is generated when a player accesses the chat feature 153 or the comment feature 154 (FIG. 1B) to communicate with another player. As another example, the AI processor 308 receives the input data 312, which includes video data and audio data of a video chat between the player 1 and the player 2. As yet another example, the AI processor 308 receives the input data 312, which includes audio data of an audio chat between the players 1 and 2. As yet another example, the AI processor 308 receives a report of the player 1 as being abusive or a report of the player 1 as being praiseworthy. Reports regarding behavior of the player 1 can be received from user accounts of one or more other players, such as the players 2 through 4. To illustrate, a first report of abusive or praiseworthy behavior by the player 1 is received from the player 2 via the user account 2. A second report of abusive or praiseworthy behavior by the player 1 is received from the player 3 via a user account 3 assigned to the player 3 by the server system 152. A third report of abusive or praiseworthy behavior by the player 1 is received from the player 4 via a user account 4 assigned to the player 4 by the server system 152. The first report is received in the operation 104 or 114. The second and third reports are stored as one of the profile factors.

Other examples of the input data 312 include a game state of the game and the game state corresponds to an indication of selection of one or more buttons on a client device, such as one or more buttons of the hand-held controller of the client device. A player selects the one or more buttons on the hand-held controller. The game engine 302 receives the indication of the selection from the client device via the computer network 156 and determines a game state of the game based on the indication. For example, the game engine 302 determines a position and orientation of a virtual object, such as a virtual character, in a virtual scene based on an indication of a selection of the one or more buttons made by the player. Illustrations of the virtual object include a virtual bullet, a virtual weapon, a virtual dog, a virtual gun, a virtual vehicle, a virtual lamp, a virtual house, a virtual building, and any other virtual item in a virtual scene. The game state is stored by the game engine 302 in the memory device 310. The AI processor 308 accesses and identifies the game state of the game corresponding to the indication of the selection from the memory device 310.

The AI processor 308 executes a game recording program 314 to record the input data 312 and the weighted factors within the memory device 310. For example, the AI processor 308 stores, such as writes, the weighted factors and the input data 312 to the memory device 310. The input data 312 is stored in the memory device 310 for the pre-determined time period. As an example, the input data 312 is stored in the memory device 310 for the pre-determined time period that begins at a time before the reception of the report of abuse in the operation 104 (FIG. 1A) and ends at a time the player abuse is confirmed in the operation 108 (FIG. 1A) or ends at a time the absence of abuse is determined in the operation 112 (FIG. 1A). As another example, the input data 312 is stored in the memory device 310 for the pre-determined time period that begins at a time before the reception of the report of abuse in the operation 104 (FIG. 1A) and ends at a time a result of the operation 110 (FIG. 1A) is achieved. The result of the operation 110 can be that the player 1 is found abusive based on the appeal or is found not abusive based on the appeal. The pre-determined time period includes a time of reception of the report of abuse in the operation 104. As another example, the input data 312 is stored in the memory device 310 for the pre-determined time period that begins at a time before the reception of the report of the praiseworthy behavior in the operation 114 (FIG. 1A) and ends at a time the praiseworthy behavior is confirmed in the operation 118 (FIG. 1A) or ends at a time the rewards are provided in the operation 120. As yet another example, the input data 312 is stored in the memory device 310 for the pre-determined time period that begins at a time before the reception of the report of the praiseworthy behavior in the operation 114 (FIG. 1A) and ends at a time action is not taken in the operation 122. The pre-determined time period includes a time of reception of the report of the praiseworthy behavior in the operation 114.

As yet another example, the input data 312 is stored in the memory device 310 for the pre-determined time period that begins at a time of reception of the report of abuse in the operation 104 (FIG. 1A) and ends at a time the player abuse is confirmed in the operation 108 (FIG. 1A) or ends at a time the absence of abuse is determined in the operation 112 (FIG. 1A). As another example, the input data 312 is stored in the memory device 310 for the pre-determined time period that begins at a time of the reception of the report of abuse in the operation 104 (FIG. 1A) and ends at a time the result of the operation 110 (FIG. 1A) is achieved. As another example, the input data 312 is stored in the memory device 310 for the pre-determined time period that begins at a time of the reception of the report of the praiseworthy behavior in the operation 114 (FIG. 1A) and ends at a time the praiseworthy behavior is confirmed in the operation 118 (FIG. 1A) or ends at a time the rewards are provided in the operation 120. As yet another example, the input data 312 is stored in the memory device 310 for the pre-determined time period that begins at a time of the reception of the report of the praiseworthy behavior in the operation 114 (FIG. 1A) and ends at a time action is not taken in the operation 122. The pre-determined time period includes a time of reception of the report of the praiseworthy behavior in the operation 114. As yet another example, the input data 312 is stored in the memory device 310 during the pre-determined number of one or more previous gaming sessions of the game played by the players 1 through 4. The one or more previous gaming sessions are further described below.

Also, after recording the input data 312, the AI processor 308 associates, such as establishes a one-to-one correspondence or a mapping, between a chat or comment made by the player 1 to the player 2 and a game state that is generated within a pre-set time interval before or after a time at which the chat or comment is made. The pre-set time interval is stored in the memory device 310. For example, the AI processor 308 determines that the virtual character 208 (FIG. 2B) is being shot at by the virtual character 206 during a time period in which the player 1 chats, using abusive language, with the player 2. The input data 312 includes the game state, which indicates that the virtual character 206 shoots at the virtual character 208. In this example, the AI processor 308 uses a clock, such as an Internet clock, to determine that the virtual character 208 (FIG. 2B) is being shot at during the time period in which the player 2 chats with the player 1. As another example, the AI processor 308 determines that the virtual character 212 (FIG. 2C) is being shot at by the virtual character 206 during a time period in which the player 1 chats, using praiseworthy language, with the player 2. Also, during the time period, the player 1 controls the virtual character 206 to move towards the virtual character 210 (FIG. 2C). In this example, the AI processor 308 establishes a one-to-one relationship between the game state of the input data 312 and the chat language. Also, in the example, the game state indicates that the virtual character 206 shoots at the virtual character 212 while simultaneously moving towards the virtual character 210. In this example, the AI processor 308 uses the clock to determine that the virtual character 212 (FIG. 2C) is being shot at during the time period in which the player 1 chats with the player 2 by using the praiseworthy language.

Upon receiving the report, in the operation 104, of the abuse, the AI processor 308 accesses, such as reads, the weighted factors, the input data 312, the correspondences between game states of the input data 312 and the chats or comments, or a combination thereof from the memory device 310. Similarly, upon receiving the report, in the operation 114, of the praiseworthy conduct, the AI processor 308 accesses, such as reads, the weighted factors, the input data 312, the correspondence between game states of the input data 312 and the chats or comments, a combination thereof from the memory device 310.

The AI processor 308 executes a training engine 316 to train an AI model 318 based on the weighted factors, or the input data 312, or the correspondences between the game states of the input data 312 and the chats or comments, or a combination of two or more thereof. The training engine 316 includes a feature extractor 320 and a feature classifier 322. An example of each of the feature extractor 320, the feature classifier 322, and the AI model 318 is an ASIC. Another example of each of the feature extractor 320, the feature classifier 322, and the AI model 318 is a PLD. An example of the AI model 318 is a network of circuit elements. Each circuit element has one or more inputs and one or more outputs. An input of a circuit element is coupled to one or more outputs of one or more circuit elements. To illustrate, the AI model 318 is a neural network or a machine learning computer network. The feature classifier 322 is coupled to the feature extractor 320 and to the AI model 318.

The feature extractor 320 extracts features from the weighted factors, the input data 312, the correspondences between game states of the input data 312 and the chats or comments, or a combination thereof that is recorded in the memory device 310. For example, the feature extractor 320 applies or includes a textual recognition program or a phoneme recognition computer program or a viseme recognition computer program or a body language recognition computer program to recognize or determine words that are communicated by one player towards another player during the play of the game. Words can be communicated using the chat feature 153 or the comment feature 154 (FIG. 1B). To illustrate, the feature extractor 320 analyzes or parses audio data of language used by one player towards another to identify words of the audio data. As another illustration, the feature extractor 320 analyzes or parses images of a video chat between two players to identify words or actions or gestures used by one player towards another. As another example, the feature extractor 320 identifies a number of reports of behavior regarding the player 1 in the profile factors. As yet another example, the feature extractor 320 identifies that a report received, in the operation 104 or 114 (FIG. 1A), regarding the behavior of the player 1 is the latest one. To illustrate, the feature extractor 320 uses the clock, such as the Internet clock, to determine a first date and a first time at which a first report is received and a second date and a second time at which a second report is received. The feature extractor 320 determines that the second date is after the first date to determine that the second report is received after the first report. Also, in case both the first and second dates are the same, the feature extractor 320 determines so and further determines that the second time is after the first time to determine that the second report is received after the first report. As another example, the feature extractor 320 identifies the weights Wn1 through Wnm from the weighted factors. To illustrate, the feature extractor 320 determines that the weight Wnm has a letter "W" followed by a number, which identifies an amount of the weight. The letter "W" identifies an existence of the weight.

Also, as another example, the feature extractor 320 identifies a game state of the input data 312. To illustrate, the feature extractor 320 identifies that the game state indicates that the virtual character 206 shoots the virtual character 208. When the virtual character 206 shoots the virtual character 208 in the same team as the virtual character 206, a chance, such as a probability, of the virtual character 208 winning the game decreases to zero. In the illustration, the game state is generated upon receiving an indication of selection of one or more buttons of the hand-held controller of the client device 1. As another illustration, the feature extractor 320 identifies that the game state indicates that the virtual character 206 shoots at the virtual character 212 while moving towards the virtual character 210. When the virtual character 206 shoots at the virtual character 212, a chance of the virtual character 208 in winning the game increases. In this illustration, the game state is generated upon receiving an indication of selection of one or more buttons of the hand-held controller of the client device 1. As yet another illustration, the feature extractor 320 identifies that the game state indicates that the virtual character 206 is providing a virtual medical kit to help the virtual character 210 recover from virtual injuries. Examples of the features that are extracted by the feature extractor 320 include words of a player towards another player during a chat, or virtual actions by virtual characters of the game, or facial expressions of a player towards another player during the chat or during the play of the game, or body expressions of a player towards another player during the chat or during the play of the game, or a combination thereof. As yet another example, the feature extractor 320 identifies a number of reports of the player 1 by one or more other players. To illustrate, the feature extractor 320 identifies that the player 2 has submitted a first report identifying behavior of the player 1 as being abusive or praiseworthy and the player 3 has submitted a second report identifying behavior of the player 1 as being abusive or praiseworthy.

The feature classifier 322 classifies the features to determine whether the weighted factors, the input data 312, the correspondences between game states of the input data 312 and the chats or comments, or a combination thereof includes an indication of the abusive behavior or the praiseworthy behavior. The features are classified to output classifications. For example, the feature classifier 322 identifies negative words, such as demeaning words or derogatory words or insulting words or accusations, from the features that are extracted by the feature extractor 320 to determine that the input data 312 includes the abusive behavior. As another example, the feature classifier 322 identifies negative facial expressions or negative body expressions, of a player towards another player via a video chat or a broadcast, to determine that the input data 312 includes the abusive behavior. Some illustrations of the negative body expressions include a thumbs down expression and a looser expression made with fingers by a player. Illustrations of the negative facial expression include a facial expression expressing anger or lack of trust. As yet another example, the feature classifier 322 determines that the game state indicates that a virtual character shoots at another virtual character of the same team or gives a virtual medical kit to a virtual character of an opposite team to determine that the input data 312 includes the abusive behavior.

As another example, the feature classifier 322 identifies that a number of reports of behavior regarding the player 1 in the profile factors indicate that the reports are regarding the abusive behavior. To illustrate, the reports have a title "abusive reports" in a list of the profile factors of the player 1. As yet another example, the feature classifier 322 identifies that a report received regarding the behavior of the player 1 indicates the abusive behavior of the player 1. To illustrate, the feature classifier 322 parses a title of a report or words of the report to determine that the word "abuse" or "abusive" is used in the report. Upon determining so, the feature classifier 322 classifies the report as a report regarding the abusive behavior of the player 1.

As another example, the feature classifier 322 identifies positive words, such as kind words or motivational words or peaceful words or respectful words, from the features extracted by the feature extractor 320 to determine the input data 312 includes the praiseworthy behavior. As another example, the feature classifier 322 identifies positive facial expressions or positive body expressions, of a player towards another player via a video chat or a broadcast, to determine that the input data 312 includes the praiseworthy behavior. Some illustrations of the positive body expressions include a thumbs up expression and a winner expression made with fingers by a player. Illustrations of the positive facial expression include a facial expression expressing respect or trust. As another example, the feature classifier 322 determines that a game state indicates that a virtual character shoots at another virtual character of an opposite team or gives a virtual medical kit to a virtual character of the same team to determine that the input data 312 includes the praiseworthy behavior. As yet another example, the feature classifier 322 identifies that a report of behavior of the player 1 received from the player 2 via the user account 2 indicates that the player 1 engages in abusive behavior. Also, the feature classifier 322 identifies that a report of behavior of the player 1 received from the player 3 via the user account 3 indicates that the player 1 engages in abusive behavior. As still another example, the feature classifier 322 identifies that a report of behavior of the player 1 received from the player 2 via the user account 2 indicates that the player 1 engages in praiseworthy behavior. Also, the feature classifier 322 identifies that a report of behavior of the player 1 received from the player 3 via the user account 3 indicates that the player 1 engages in praiseworthy behavior.

As another example, the feature classifier 322 identifies that a number of reports of behavior regarding the player 1 in the profile factors indicate that the reports are regarding the praiseworthy behavior. To illustrate, the reports have a title "praiseworthy reports" in a list of the profile factors of the player 1. As yet another example, the feature classifier 322 identifies that a report received regarding the behavior of the player 1 indicates the praiseworthy behavior of the player 1. To illustrate, the feature classifier 322 parses a title of a report or words of the report to determine that the word "praiseworthy" or "great behavior" is used in the report. Upon determining so, the feature classifier 322 classifies the report as a report regarding the praiseworthy behavior of the player 1.

Examples of the classifications include instances of abusive behavior, such as abusive acts or negative acts, and instances of praiseworthy behavior, such as praiseworthy acts or positive acts, identified from the weighted factors, the input data 312, the correspondences between game states of the input data 312 and the chats or comments, or a combination thereof. To illustrate, each time an abusive word is identified or an abusive facial expression is identified or an abusive body expression is recognized or an abusive behavior of a virtual character is determined or a report indicating that the player 1 engages in abusive behavior is identified, an instance of abusive act occurs. As another illustration, each time a praiseworthy word is identified or a praiseworthy facial expression is identified or a praiseworthy body expression is recognized or a praiseworthy behavior of a virtual character is determined or a report indicating that the player 1 engages in praiseworthy behavior is identified, an instance of praiseworthy act occurs. As another illustration, upon determining that a pre-determined number of abusive words are identified or a pre-set number of abusive facial expressions are identified or a pre-stored number of abusive body expressions are recognized or a pre-fixed number of abusive behaviors of a virtual character are determined or a preset number of reports indicating that the player 1 engages in abusive behavior are identified, an instance of the abusive act occurs. In this illustration, the pre-determined number of abusive words, the pre-set number of abusive facial expressions, the pre-fixed number of abusive behaviors of the virtual character, the pre-fixed number of abusive behaviors, and the preset number of reports regarding abuse are stored in the memory device 310. As yet another illustration, upon determining that a pre-determined number of praiseworthy words are identified or a pre-set number of praiseworthy facial expressions are identified or a pre-stored number of praiseworthy body expressions are recognized or a pre-fixed number of praiseworthy behaviors of a virtual character are determined or a preset number of reports indicating that the player 1 engages in praiseworthy behavior are identified, an instance of the praiseworthy act occurs. In this illustration, the pre-determined number of praiseworthy words, the pre-set number of praiseworthy facial expressions, the pre-fixed number of praiseworthy behaviors of the virtual character, the pre-fixed number of abusive behaviors, and the preset number of reports are stored in the memory device 310.

The AI model 318 is trained by the AI processor 308 according to the instances of the abusive behavior and the instances of the praiseworthy behavior. For example, the AI model 318 determines a probability that the player 1 will engage in the abusive behavior during a next gaming session and a probability the player 1 will engage in the praiseworthy behavior during the next gaming session of the game. To illustrate, upon determining that the player 1 has engaged in the abusive behavior for a number of instances greater than a pre-stored number and has engaged in the praiseworthy behavior for a number of instances less than the pre-stored number during the pre-determined number of one or more previous gaming sessions of the game or during the pre-determined period of time for which the input data 312 is stored within the memory device 310 (FIG. 3A), the AI model 318 determines that a probability that the player 1 will engage in the abusive behavior during the next gaming session is greater than 50% and a probability that the player 1 will engage in the praiseworthy behavior during the next gaming session is less than 50%.

On the other hand, upon determining that the player 1 has engaged in the praiseworthy behavior for a number of instances greater than the pre-stored number and has engaged in the abusive behavior for a number of instances less than the pre-stored number during the pre-determined number of one or more previous gaming sessions of the game or during the pre-determined period of time for which the input data 312 is stored within the memory device 310 (FIG. 3A), the AI model 318 determines that a probability that the player 1 will engage in the praiseworthy behavior during the next gaming session is greater than 50% and a probability that the player 1 will engage in the abusive behavior during the next gaming session is less than 50%. Also, upon determining that the player 1 has engaged in the praiseworthy behavior for a number of instances equal to the pre-stored number and has engaged in the abusive behavior for a number of instances equal to the pre-stored number during the pre-determined number of one or more previous gaming sessions of the game or during the pre-determined period of time for which the input data 312 is stored within the memory device 310 (FIG. 3A), the AI model 318 determines that a probability that the player 1 will engage in the praiseworthy behavior during the next gaming session is equal to 50% and a probability that the player 1 will engage in the abusive behavior during the next gaming session is equal to 50%. As used herein, the pre-determined number of one or more previous gaming sessions precede the next gaming session. There are no other gaming sessions between the one or more previous gaming sessions and the next gaming session.

It should be noted that in the preceding illustration for calculating the probabilities of the praiseworthy behavior and the abusive behavior of the player 1, some of the instances of the abusive behavior and some of the instance of the praiseworthy behavior are weighted or normalized according to the weights $W1m$ through $Wnm$. For example, instances of reports, within the profile factors, of the abuse by the player 1 are weighted by the weight $W3m$. Also, instances of reports, within the profile factors, of the praiseworthy behavior of the player 1 are weighted by the weight $W4m$. As another example, an instance of the report of the abuse received in the operation 104 (FIG. 1A) is weighted by the weight $W1m$ and an instance of the report of the praiseworthy conduct received in the operation 114 (FIG. 1A) is weighted by the weight $W2m$. To illustrate, an instance of the report of the abuse received in the operation 104 counts as one instance but has a low weight such as 0.2, so the instance reduces to a 0.2 instance of the report of the abuse. The low weight is less than one. As another illustration, an instance of the report of the praiseworthy conduct received in the operation 114 counts as one instance but has a high weight such as 1.2, so the instance increase to a 1.2 instance. The high weight is greater than one.

An example of a gaming session is a period of time commencing when a player initiates the game on a client device after logging into her or his user account and ending at a time of a final game outcome for the game or at a time the player logs out of the user account. Another example of a gaming session is a period of time commencing when a player initiates the game on a client device after logging into her or his user account and ending at a time of an abrupt end of the game without the final game outcome. Illustrations of the abrupt end of the game include the player turning off a client device or logging out of her or his user account or the player quitting the game without achieving the final game outcome or the game ending due to a loss of power to the client device or due to a weak network connection between the client device and the server system 152 (FIG. 1B). Yet another example of the gaming session is a period of time that starts when a virtual character controlled by the player starts playing the game and ends when the virtual character controlled by the player loses or wins the game.

It should be noted that in one embodiment, upon receiving an indication a report, in the operation 104 (FIG. 1A) from the player 2 via the user account 2 that the player 1 engages in abusive behavior or a report, in the operation 114 (FIG. 1A) from the player 2 via the user account 2 that the player 1 engages in praiseworthy behavior, the AI model 318 determines a probability that the player 2 will engage in abusive behavior and a probability that the player 2 will engage in praiseworthy behavior in addition to the probability that the player 1 will engage in abusive behavior and the probability that the player 1 will engage in praiseworthy behavior. For example, the player 2, who reports the player 1 as engaging in abusive behavior, in reality, engages in abusive behavior. In this example, the AI model 318 determines that a probability that the player 1 will engage in abusive behavior during the next gaming session is greater than a probability that the player 1 will engage in praiseworthy behavior and a probability that the player 2 will engage in abusive behavior during the next gaming session is greater than a probability that the player 2 will engage in praiseworthy behavior. Upon determining so, the AI model 318 determines that a credibility of the player 2 is low and reduces the probability that the player 1 will engage in abusive behavior during the next gaming session compared to the probability that the player 1 will engage in praiseworthy behavior. To illustrate, upon determining that the credibility of the player 2 is low, the AI model 318 determines that a probability that the player 1 will engage in abusive behavior during the next gaming session is less compared to a probability that the player 1 will engage in praiseworthy behavior.

As another example, the player 2, who reports the player 1 as engaging in abusive behavior, in reality, engages in praiseworthy behavior. In this example, the AI model 318 determines that a probability that the player 1 will engage in abusive behavior during the next gaming session is greater than a probability that the player 1 will engage in praiseworthy behavior and a probability that the player 2 will engage in praiseworthy behavior during the next gaming session is greater than a probability that the player 2 will engage in abusive behavior. Upon determining so, the AI model 318 determines that a credibility of the player 2 is high and confirms or determines that the probability that the player 1 will engage in abusive behavior during the next gaming session is greater than the probability that the player 1 will engage in praiseworthy behavior.

As yet another example, the player 2, who reports the player 1 as engaging in praiseworthy behavior, in reality, engages in abusive behavior. In this example, the AI model 318 determines that a probability that the player 1 will engage in praiseworthy behavior during the next gaming session is greater than a probability that the player 1 will engage in abusive behavior and a probability that the player 2 will engage in abusive behavior during the next gaming session is greater than a probability that the player 2 will engage in praiseworthy behavior. Upon determining so, the AI model 318 determines that a credibility of the player 2 is low and reduces the probability that the player 1 will engage in praiseworthy behavior during the next gaming session compared to the probability that the player 1 will engage in abusive behavior.

As still another example, the player 2, who reports the player 1 as engaging in praiseworthy behavior, in reality, engages in praiseworthy behavior. In this example, the AI model 318 determines a probability that the player 1 will engage in praiseworthy behavior during the next gaming session is greater than a probability that the player 1 will engage in abusive behavior and a probability that the player 2 will engage in praiseworthy behavior during the next gaming session is greater than a probability that the player 2 will engage in abusive behavior. Upon determining so, the AI model 318 determines that a credibility of the player 2 is high and confirms or determines the probability that the player 1 will engage in praiseworthy behavior during the next gaming session is greater than the probability that the player 1 will engage in abusive behavior.

The probability that the player 2 will engage in abusive behavior during the next gaming session is determined in the same manner in which the probability that the player 1 will engage in abusive behavior is determined and the probability that the player 2 will engage in praiseworthy behavior during the next gaming session is determined in the same manner in which the probability that the player 1 will engage in praiseworthy behavior is determined. For example, a report of abuse by the player 2 and/or a report of praiseworthy behavior of the player 2 received from another player, profile factors of the user account 2, chat data generated from the user account 2 within the pre-determined time period or during the pre-determined number of one or more previous gaming sessions of the player 2, comments generated from the user account 2 within the pre-determined time period or during the pre-determined number of one or more previous gaming sessions of the player 2, and game state of the game played by the player 2 are provided to the AI model 318 to train the AI model 318. The AI model 318 is trained to determine the probability that the player 2 will engage in the abusive behavior during the next gaming session and the probability that the player 2 will engage in the praiseworthy behavior during the next gaming session.

Figure 3B:
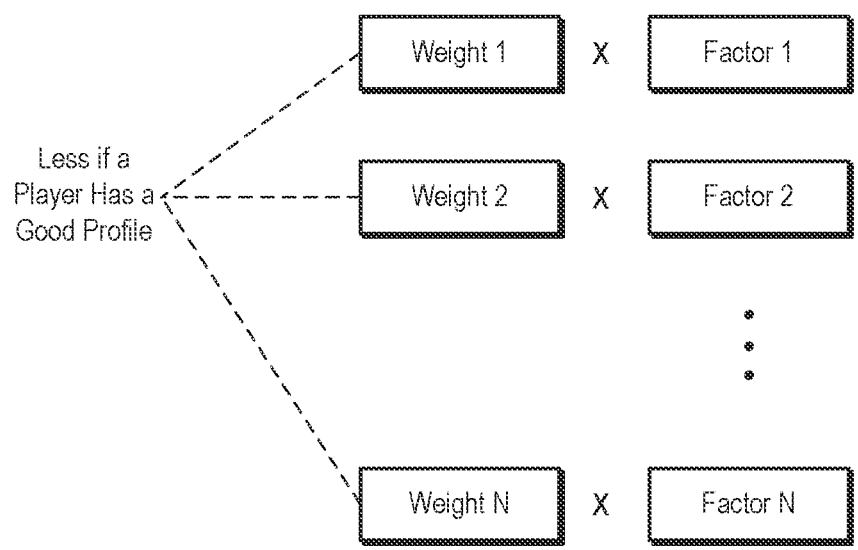
FIG. 3B is a diagram to illustrate an application of weights to multiple profile factors.

FIG. 3B is a diagram to illustrate an application of weights to the profile factors. The weights are applied to the profile factors by the server system 152 (FIG. 1B). For example, a profile factor 1 is multiplied by a weight 1, a profile factor 2 is multiplied by a weight 2, and so on until a profile factor N is multiplied by weight N. An example of the weight 1 is the weight Wn2, an example of the weight 2 is the weight Wn3, and an example of the weight N is the weight Wnm. The weights Wn2, Wn3, and Wnm are described above with reference to FIG. 1A.

The server system 152 determines values of the weights 1 through N based on a profile of a player, such as the player 1. For example, the server system 152 accesses a profile factor of the player from the player profile database 158 (FIG. 1B), and determines whether the profile factor of the player exceeds a pre-determined threshold. The pre-determined threshold is stored within the memory system 160 (FIG. 1B). To illustrate, the server system 152 determines whether a number of kills by the player 1 is greater than 10 during each gaming session, or whether a number of times the player 1 has helped another player of the same team is greater than 5 during each gaming session, or whether a shooting accuracy of the player 1 is greater than 60 percent during each gaming session, or whether a number of instances for which the player 1 is determined to engage in praiseworthy behavior by the AI model 318 is greater than two.

Upon determining that a first profile factor having the number of kills by the player 1 is greater than 10 during each gaming session, the server system 152 determines that the first profile factor exceeds a first pre-determined threshold. Also, upon determining that a second profile factor having the number of times the player 1 has helped another player of the same team is greater than 5 during each gaming session, the server system 152 determines that the second profile factor exceeds a second pre-determined threshold. Moreover, upon determining that a third profile factor having the shooting accuracy of the player 1 is greater than 60 percent during each gaming session, the server system 152 determines that the third profile factor exceeds a third pre-determined threshold. Upon determining that a fourth profile factor having the number of instances for which the player 1 is determined, by the AI model 318, to engage in the praiseworthy behavior is greater than two, the server system 152 determines that the fourth profile factor exceeds a fourth pre-determined threshold.

On the other hand, upon determining that the first profile factor having the number of kills by the player 1 is not greater than 10 during each gaming session, the server system 152 determines that the first profile factor does not exceed the first pre-determined threshold. Also, upon determining that the second profile factor having the number of times the player 1 has helped another player of the same team is not greater than 5 during each gaming session, the server system 152 determines that the second profile factor does not exceed the second pre-determined threshold. Moreover, upon determining that the third profile factor having the shooting accuracy of the player 1 is not greater than 60 percent during each gaming session, the server system 152 determines that the third profile factor does not exceed the third pre-determined threshold. Upon determining that the fourth profile factor having the number of instances for which the player 1 is determined to engage in the praiseworthy behavior by the AI model 318 is not greater than two, the server system 152 determines that the fourth profile factor does not exceed the fourth pre-determined threshold.

Upon determining that a profile factor exceeds a corresponding pre-determined threshold, the server system 152 assigns a corresponding one of the weights 1 through N to the profile factor and the weight is greater than a preset threshold. For example, in response to determining that the first profile factor exceeds the first pre-determined threshold, the server system 152 assigns a first weight to the first profile factor and the first weight is greater than the preset threshold. The preset threshold to be assigned to the weights 1 through N is stored in the memory system 160. On the other hand, upon determining that the profile factor does not exceed the corresponding pre-determined threshold, the server system 152 assigns a corresponding one of the weights 1 through N to the profile factor and the weight is not greater than the preset threshold.

Figure 4A:
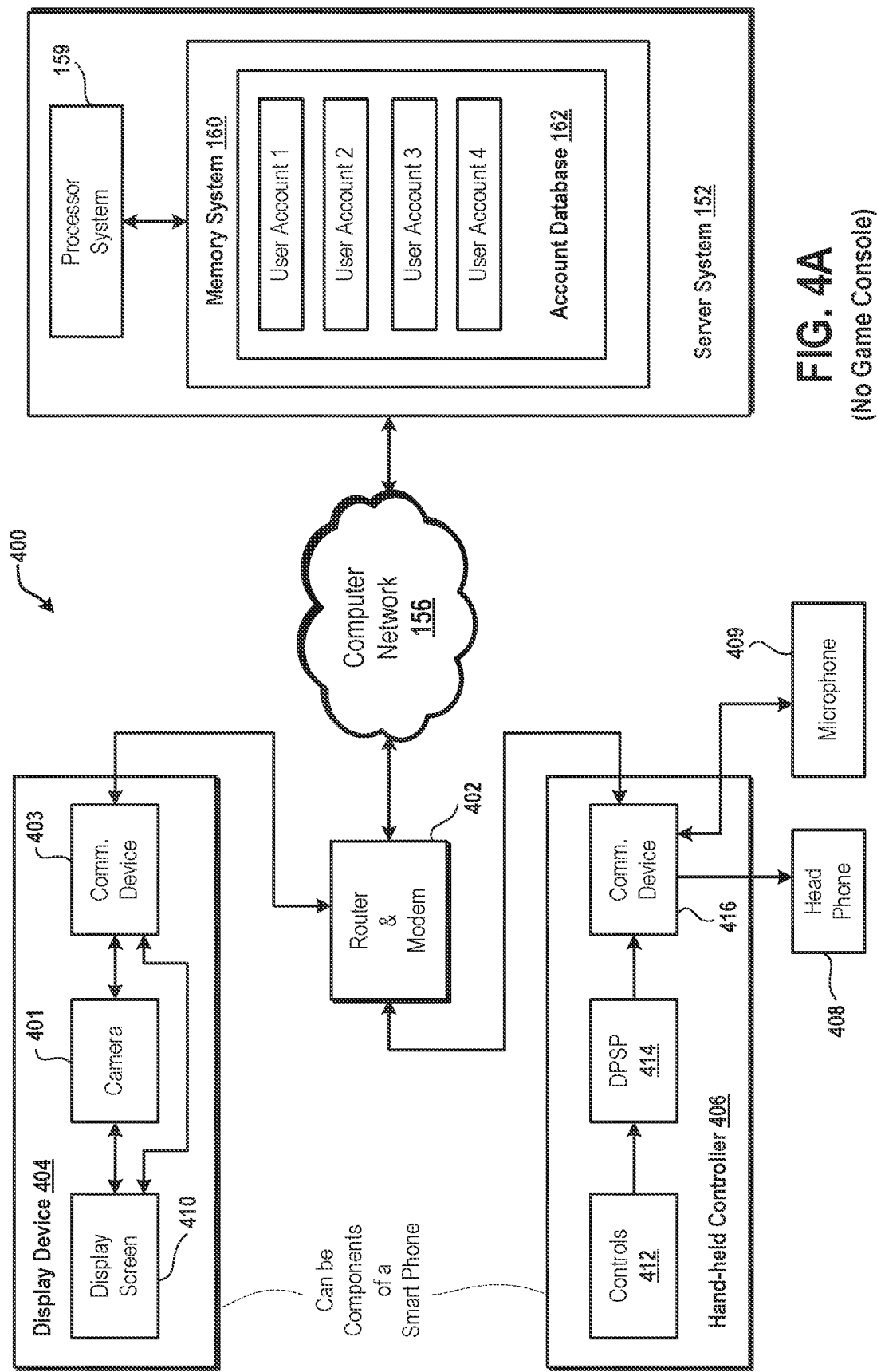
FIG. 4A is a diagram of an embodiment of a system to illustrate a communication via a router and modem and a computer network between a processor system and multiple client devices.

FIG. 4A is a diagram of an embodiment of a system 400 to illustrate a communication via a router and modem 402 and the computer network 156 between the server system 152 and multiple client devices. As an example, each client device, such as the client device 1, or 2, or 3, or 4 (FIG. 1B), includes a display device, which can be a display device 404. Also, in the example, each client device includes a hand-held controller, such as a hand-held controller 406. The display device 404 is an example of any of the display device 1 (FIG. 1B), the display device 2 (FIG. 1B), the display device 3 (FIG. 1B), and the display device 4 (FIG. 1B). To illustrate, the display device 404 is an LCD display device, or an LED display device, or a plasma display device, or a head-mounted display device. The display device 404 includes a camera 401 and a communication device 403. The camera 401 is coupled to the communication device 403, which is coupled to a display screen 410 of the display device 404. The camera 401 is an example of an image capture device. Examples of the camera 401 include an optical instrument used to record images of a player in front of the camera 401. The camera 401 also captures image of a real-world environment, such as a room or an open area, surrounding the player. An example of the camera 401 is a digital camera that encodes digital images.

The hand-held controller 406 is an example of the input device 1 or the input device 2 (FIG. 1B). Each of the display device 404 and the hand-held controller 406 is used by a player, such as the player 1. Also, each of the players 2-4 (FIG. 1B) uses a hand-held controller having the same structure and function as that of the hand-held controller 406 and a display device having the same structure and function as that of the display device 404.

The system 400 further includes the router and modem 402, the computer network 156, and the server system 152. The system 400 also includes a headphone 408, a microphone 409, and the display device 404. Examples of the display screen 410 include an LCD display screen, and LED display screen, and a plasma display screen. An example of the computer network 156 includes the Internet or an intranet or a combination thereof. An example of the router and modem 402 includes a gateway device. Another example of the router and modem 402 includes a router device and a modem device. An example of the microphone 409 is a transducer that converts sound into electrical signals.

The display device 404 is coupled to the router and modem 402 via a wired connection or a wireless connection. Examples of a wired connection, as used herein, include a transfer cable, which transfers data in a serial manner, or in a parallel manner, or by applying a universal serial bus (USB) protocol.

The hand-held controller 406 includes controls 412, a digital signal processor system (DSPS) 414, and a communication device 416. The controls 412 are coupled to the DSPS 414, which is coupled to the communication device 416. Examples of the controls 412 include buttons and joysticks. Examples of a communication device, as used herein, includes a communication circuit that enables communication using a wireless protocol, such as Wi-Fi™ or Bluetooth™, between the communication device and the router and modem 402.

The communication device 416 is coupled to the headphone 408 via a wired connection or a wireless connection. Examples of a wireless connection, as used herein, include a connection that applies a wireless protocol, such as a Wi-Fi™ or Bluetooth™ protocol. Also, the communication device 416 is coupled to the microphone 409 via a wireless or wired connection. Also, the communication device 416 is coupled to the router and modem 402 via a wireless connection. Examples of a wireless connection include a Wi-Fi™ connection and a Bluetooth™ connection. The communication device 403 is coupled to the router and modem 402 via a wired or wireless connection. The router and modem 402 is coupled to the computer network 156, which is coupled to the processor system 159.

During the play of the game, the processor system 159 executes the game program of the game engine 302 to generate image frame data from one or more game states of the game and applies a network communication protocol, such as transfer control protocol over Internet protocol (TCP/IP), to the image frame data to generate one or more packets and sends the packets via the computer network 156 to the router and modem 402. The modem of the router and modem 402 applies the network communication protocol to the one or more packets received from the computer network 156 to obtain or extract the image frame data, and provides the image frame data to the router of the router and modem 402. The router routes the image frame data via the wired connection between the router and the display device 404 to the display screen 410 for display of one or more images of the game based on the image frame data received within the one or more packets.

During the display of one or more images of the game on the display screen 410, the processor system 159 facilitates execution of the operations 104 and 114 of the method 100 (FIG. 1A). For example, during execution of the method 100, the controls 412 of the hand-held controller 406 are selected or moved by the player to generate a first controller input signal, which is processed by the DSPS 414. The first controller input signal includes an indication, such as an identification, that a report is regarding the abuse in the operation 104 or regarding the praiseworthy behavior in the operation 114 (FIG. 1A).

Also, during the display of one or more images of the game by the processor system 159, a player uses the microphone 409 and the chat feature 153 or the comment feature 154 (FIG. 1B) to provide sounds, which are converted into an input audio signal by the microphone 409. Moreover, during the display of one or more images of the game, the camera 401 of the display device 404 captures one or more images of the player to output an input video signal. The images of the player are captured during execution of the chat feature 153 or the comment feature 154. Moreover, during the display of one or more images of the game, the controls 412 of the hand-held controller 406 are selected or moved by the player to chat with or provide comments to another player to generate a second controller input signal.

The DSPS 414 processes, such as measures or samples or filters or amplifies or a combination thereof, an input signal, such as the first controller input signal, or the second controller input signal, or the input audio signal, or a combination of two or more thereof, to output a processed input signal, which has the same information as that within the input signal. To illustrate, the DSPS 414 identifies a button of the hand-held controller 406 selected by the player. As another illustration, the DSPS 414 identifies whether a joystick of the hand-held controller 406 is moved or a button of the hand-held controller 406 is selected by the player. The processed input signal is sent from the DSPS 414 to the communication device 416. The communication device 416 applies the wireless protocol to the processed input signal to generate one or more wireless packets and sends the wireless packets to the router and modem 402. The wireless packets include the same information as that included within the processed input signal.

Also, the input video signal output from the camera 401 of the display device 404 is sent to the communication device 403. The communication device 403 applies the wireless protocol to the input video signal to generate one or more wireless packets and sends the wireless packets to the router and modem 402. The wireless packets include the same information as that included within the input video signal. When a wired connection is used between the communication device 403 and the router and modem 402, the communication device 403 applies a wired protocol, such as a serial transfer protocol, or a parallel transfer protocol, or the USB protocol, to the input video signal to generate one or more transfer units and sends the transfer units via the wired connection to the router and modem 402.

The router of the router and modem 402 receives the wireless packets from the communication device 416, and applies the wireless protocol to obtain or extract the processed input signal from the wireless packets received from the communication device 416. Also, the router of the router and modem 402 receives the wireless packets from the communication device 403, and applies the wireless protocol to obtain or extract the input video signal from the wireless packets received from the communication device 403. In case the transfer units are received via a wired connection between the communication device 403 and the router and modem 402, the router of the router and modem 402 applies the wired protocol to obtain or extract the input video signal from the transfer units received from the communication device 403.

The router of the router and modem 604 provides the processed input signal and the input video signal to the modem of the router and modem 604. The modem applies the network communication protocol to the processed input signal and the input video signal to generate one or more network packets. For example, the modem determines that the processed input signal and the input video signal are to be sent to the processor system 159 that is executing the game program of the game engine 302, and embeds a network address of the processor system 159 within the one or more network packets. The modem sends the one or more network packets via the computer network 156 to the processor system 159.

The processor system 159 applies the network communication protocol to the one or more network packets received from the router and modem 402 to obtain or extract information within the processed input signal and the input video signal, and processes the information to execute one or more of the operations 106, 108, 110, 112, 116, 118, 120, and 122 of the method 100 (FIG. 1A) to generate one or more output signals. The output signals include image frame data or audio data or a combination thereof. The processor system 159 applies the network communication protocol to the output signals to generate one or more network packets. The processor system 159 sends the one or more network packets via the computer network 156 to the router and modem 402.

The modem of the router and modem 402 applies the network communication protocol to the one or more network packets received via the computer network 156 to obtain or extract the output signals. The router of the router and modem 402 applies the wireless protocol to a first set of the output signals to generate one or more wireless packets and sends the wireless packets to the communication device 416 of the hand-held controller 406. The communication device 416 of the hand-held controller 406 applies the wireless protocol to the one or more wireless packets received from the router and modem 402 to obtain or extract the first set of output signals and sends the output signals of the first set to the headphone 408 for output of the audio data as sound to the player 1. For example, the communication device 416 applies the wired protocol to generate one or more transfer units having the audio data and sends the one or more transfer units via a wired connection to the headphone 408. As another example, the communication device 416 applies the wireless protocol to the audio data to generate one or more wireless packets and sends the one or more wireless packets via a wireless connection to the headphone 408.

The headphone 408 processes the transfer units or the wireless packets to output sounds to the player. For example, the headphone 408 outputs sounds, which include a message that the abusive behavior by the player 1 is confirmed or not confirmed, as determined in the operation 108 (FIG. 1A). As another example, the headphone 408 outputs sounds and the sounds include a message that the praiseworthy behavior by the player 1 is confirmed or not confirmed, as determined in the operation 118 (FIG. 1A).

Also, the router of the router and modem 402 generates one or more wireless packets having a second set of the output signals by applying the wireless protocol and sends the wireless packets to the communication device 403. The communication device 403 applies the wireless protocol to obtain the second set of output signals from the wireless packets and sends the output signals of the second set to the display screen 410. In case of the wired connection between the router and modem 402 and the display device 404, the router of the router and modem 402 generates one or more transfer units having the second set of output signals by applying the wired protocol and sends the transfer units to the communication device 403 via the wired connection. The communication device 403 applies the wired protocol to obtain the output signals of the second set from the transfer units and sends the output signals of the second set to the display screen 410.

Upon receiving the output signals of the second set, the display screen 410 displays one or more image frames according to the image frame data of the output signals of the second set. For example, the display screen 410 displays on the display screen 410 a notification or a message that the abusive behavior by the player 1 is confirmed or not confirmed, as determined in the operation 108 (FIG. 1A). As another example, the display screen 410 displays a notification or a message that the praiseworthy behavior by the player 1 is confirmed or not confirmed, as determined in the operation 118 (FIG. 1A). As yet another example, the display screen 410 displays on the display screen 410 a value of the rewards provided in the operation 120 (FIG. 1A).

In one embodiment, the display device 404 and the hand-held controller 406 are integrated within a mobile device, such as a smartphone or a tablet or a laptop.

Figure 4B:
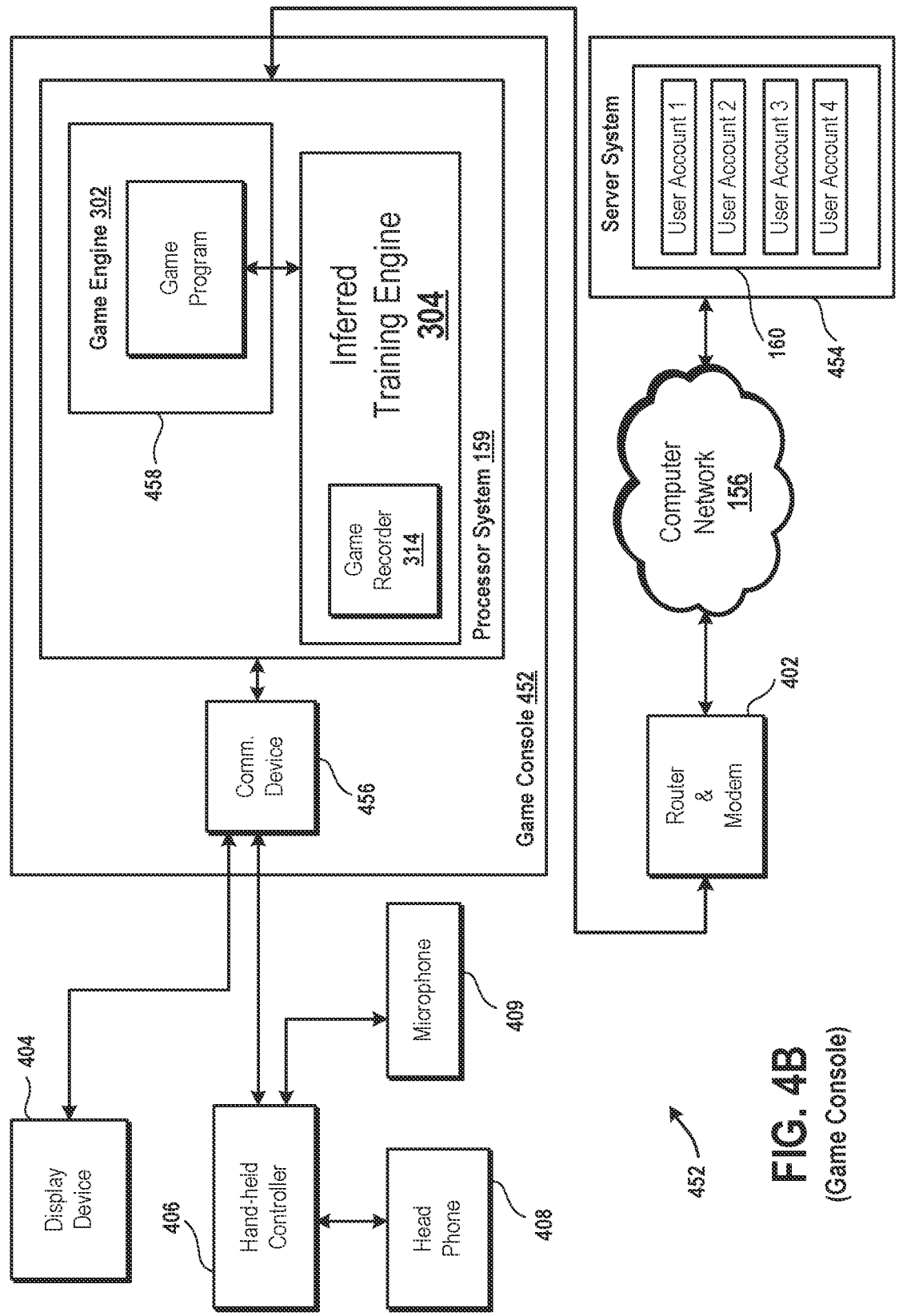
FIG. 4B is a diagram of an embodiment of a system to illustrate that the processor system can be implemented within a game console.

FIG. 4B is a diagram of an embodiment of a system 450 to illustrate that the processor system 159 can be implemented within a game console 452. The system 450 includes the display device 404, the hand-held controller 406, the headphone 408, the microphone 409, the game console 452, the router and modem 402, the computer network 156, and a server system 454. An example of the game console 452 is a video game console or a computer or a combination of a central processing unit (CPU) and a graphics processing unit (GPU). To illustrate, the game console 452 is a Sony PlayStation™ or a Microsoft Xbox™. The game console 452 includes the processor system 159 and a communication device 456, such as Wi-Fi™ communication device or a Bluetooth™ communication device. As an example, a processor system as used herein, includes one or more CPUs and one or more GPUs, and the one or more CPUs are coupled to the one or more GPUs.

The server system 454 is the same as the server system 152 (FIG. 1B) except that the server system 454 excludes the processor system 159. An example of the server system 454 includes one or more servers within one or more data centers. To illustrate, a server can be a game console or a server blade. As another example, the server system 454 includes one or more virtual machines. The communication device 456 is coupled to the communication device 403 (FIG. 4A) of the display device 404 via a wireless connection, such as a Wi-Fi™ connection or a Bluetooth™ connection, or a wired connection. Moreover, the communication device 456 is coupled to the communication device 416 (FIG. 4A) of the hand-held controller 406 via a wireless connection. The communication device 456 is coupled to the processor system 159. The processor system 159 is coupled to the router and modem 402 via a wired connection. The router and modem 402 is coupled via the computer network 156 to the server system 454.

The processor system 159 instead of or in conjunction with the server system 454 executes a game program 458 of the game engine 302 for display of virtual scenes on the display screen 410 (FIG. 4A) of the display device 404. For example, in response to receiving the login information that is provided by a player, such as the player 1, via the hand-held controller 406, the processor system 159 sends a request to the server system 454 via the computer network 156 to determine whether the login information is valid. Upon receiving an indication from the server system 454 via the computer network 156 that the login information received from the hand-held controller 406 is valid, the processor system 159 executes the game program 458 for play of the game by the player via the hand-held controller 406 and the game console 452. On the other hand, upon receiving an indication from the server system 454 via the computer network 156 that the login information received from the hand-held controller 406 is invalid, the processor system 159 does not execute the game program 458 for play by the player via the hand-held controller 406 and the game console 452.

The communication device 456 receives, via a wireless connection, the wireless packets having the processed input signal from the communication device 416 (FIG. 4A) of the hand-held controller 406, and applies the wireless protocol to the wireless packets to extract the processed input signal from the wireless packets, and provides the processed input signal to the processor system 159. The communication device 456 also receives the wireless packets or transfer units having the input video signal from the display device 404, and applies the wireless protocol to the wireless packets to extract the input video signal from the wireless packets or applies the wired protocol to extract the input video signal from the transfer units, and provides the input video signal to the processor system 159. The wireless packets are received by the communication device 456 from the communication device 403 of the display device 404 (FIG. 4A) via a wireless connection. Also, the transfer units are received by the communication device 456 from the communication device 403 of the display device 404 via a wired connection.

The processor system 159 generates the output signals of the first and second sets based on the processed input signal received from the hand-held controller 406 and the input video signal received from the display device 404. The processor system 159 provides the output signals of the first and second sets to the communication device 456. The communication device 456 applies the wireless protocol to the output signals of the first set to generate one or more wireless packets and sends the wireless packets to the communication device 416 of the hand-held controller 406. Also, the communication device 456 applies the wireless protocol to the output signals of the second set to generate one or more wireless packets and sends the wireless packets to the communication device 403 of the display device 404.

In one embodiment, some of the functions described herein as being performed by the processor system 159 of the server system 152 are performed by the processor system 159 of the game console 452 and the remaining functions, described herein as being performed by the processor system 159 of the server system 152, are instead performed by the server system 454.

In an embodiment, the processor system 159 is coupled to the display device 404 via a wired connection. The output signals of the second set are sent from the processor system 159 via the wired connection to the display device 404 for display of one or more images on the display device 404.

In one embodiment, the game is stored on the game console 452 and is a non-networked game. In this embodiment, the game is a single player game or a multi-player game and the game console 452 does not communicate to the server system 454 to access any portion of the game from the server system 454.

Figure 4C:
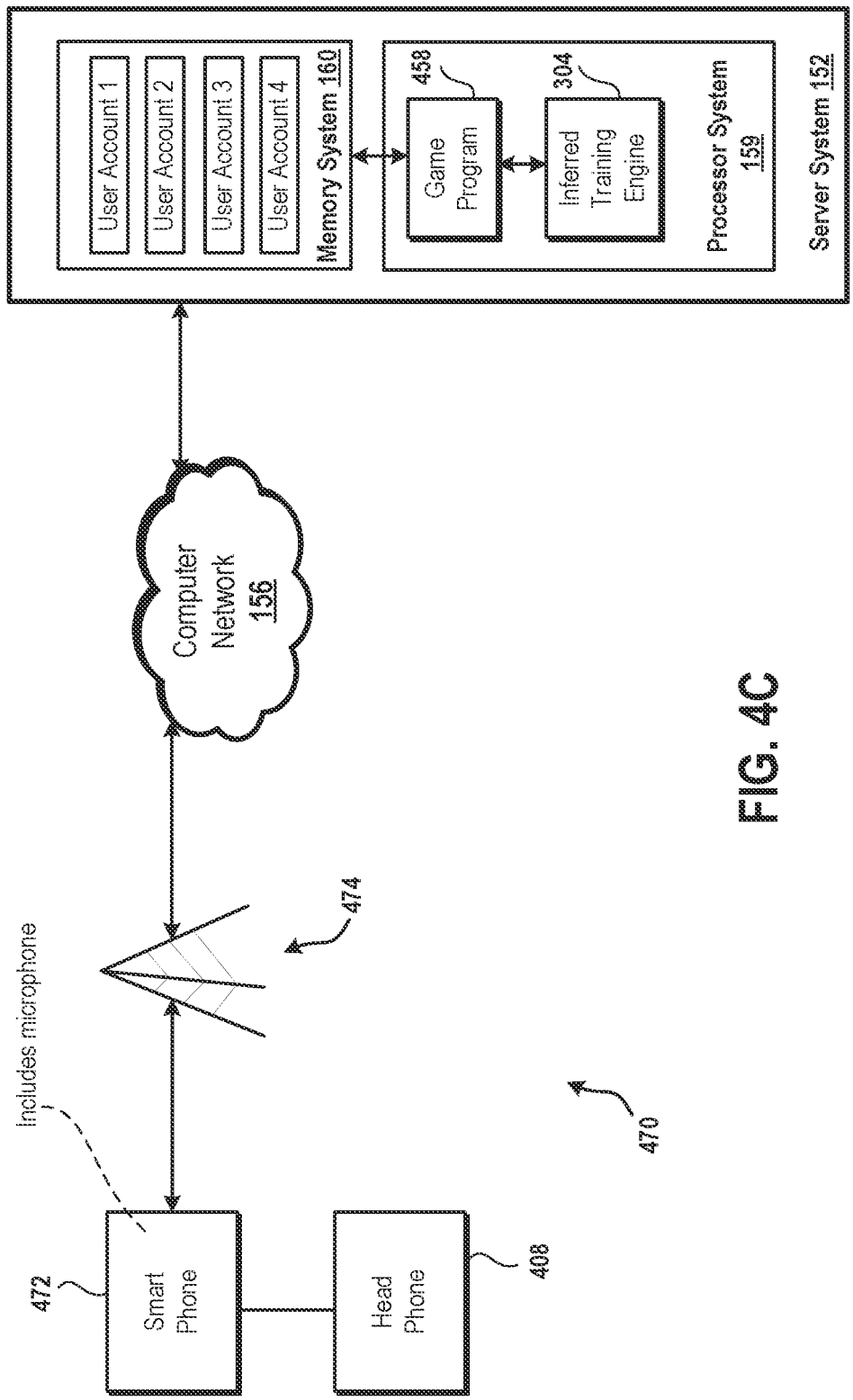
FIG. 4C is a diagram of an embodiment of a system to illustrate communication between a smart phone and the processor system via the computer network without using a router and modem between the computer network and the smart phone.

FIG. 4C is a diagram of an embodiment of a system 470 to illustrate communication between a smart phone 472 and the processor system 159 via the computer network 156 without using the router and modem 402. The router and modem 402 is not used between the computer network 156 and the smart phone 472. The system 470 includes the smart phone 472, the head phone 1110, a cellular network 474, the computer network 156, and the server system 152. The smart phone 472 is an example of any of the client devices 1 through 4 (FIG. 1B). For example, the smart phone 472 includes the display device 404, and is capable of implementing functions, described above, of the hand-held controller 406.

The smart phone 472 is coupled to the cellular network 474 via a cellular wireless connection, such as a fourth-generation cellular wireless (4G) connection or a fifth cellular wireless (5G) connection. The cellular network 474 is coupled to the computer network 156, which is coupled to the server system 152.

The smart phone 472 generates one or more packets by applying a cellular communication protocol, such as the 4G or the 5G protocol, to the processed input signal or the input video signal or a combination thereof, and sends the one or more packets to the cellular network 474. The cellular network 474 receives the one or more packets and applies the cellular communication protocol to obtain or extract the processed input signal or the input video signal or a combination thereof, and applies the network communication protocol to the processed input signal or the input video signal or a combination thereof to generate one or more network packets. The one or more network packets generated by the cellular network 474 are sent via the computer network 156 to the server system 152. The server system 152 processes the one or more network packets received from the cellular network 1102 in a manner described above to generate the output signals of the first and second sets, and sends one or more network packets including the output signals of the first and second sets via the computer network 156 to the cellular network 474.

The cellular network 474 applies the network communication protocol to the one or more network packets received from the processor system 159 to extract or obtain the output signals of the first and second sets, and applies the cellular communication protocol to the output signals of the first and second sets to generate one or more packets. The cellular network 1102 sends the one or more packets including the output signals of the first and second sets to the smart phone 472.

Figure 5:
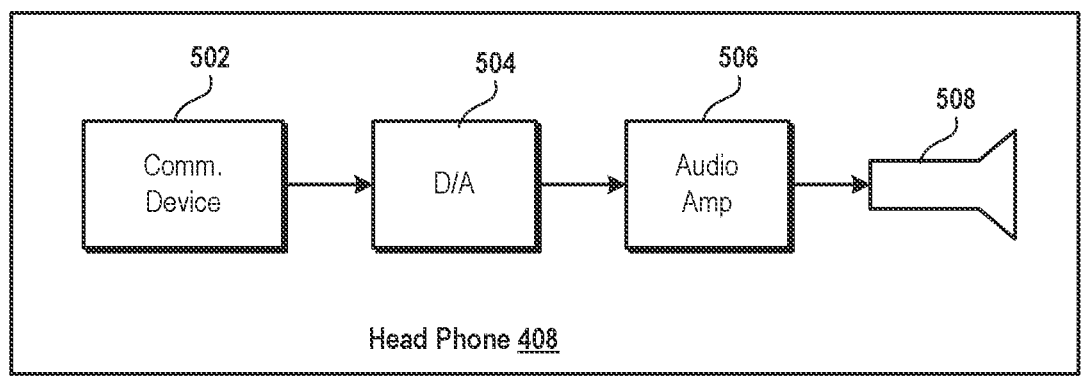
FIG. 5 is a diagram of an embodiment of a headphone.

FIG. 5 is a diagram of an embodiment of the headphone 408. The headphone 408 includes a communication device 502, a digital-to-analog (D/A) converter 504, an audio amplifier 506, and a speaker 508. An example of the communication device 502 is a communication circuit that applies the wired protocol or the wireless protocol.

The communication device 502 is coupled to the communication device 416 (FIG. 4A) of the hand-held controller 406 or to the smart phone 472 (FIG. 4C). The digital-to-analog converter 504 is coupled to the communication device 502 and the audio amplifier 506 is coupled to the digital-to-analog converter 504. Also, the speaker 508 is coupled to the audio amplifier 506.

The communication device 502 receives one or more packets having the audio data from the communication device 416 (FIG. 4A) or from the smart phone 472 (FIG. 4C), and applies a protocol, such as the wired protocol or the wireless protocol, to extract or obtain the audio data from the one or more packets. The communication device 502 sends the audio data to the digital-to-analog converter 504. The digital-to-analog converter 504 converts the audio data from a digital format to an analog format to output analog audio signals. The digital-to-analog converter 504 sends the analog audio signals output based on the audio data to the audio amplifier 506. The audio amplifier 506 amplifies, such as increases an amplitude or a magnitude, of the analog audio signals to output amplified audio signals, which are electrical signals. The speaker 508 converts electrical energy of the amplified audio signals into sound energy to output sounds to be heard by a player, such as the player 1 or 2 or 3 or 4.

In one embodiment, instead of the speaker 508, multiple speakers are used.

Figure 6:
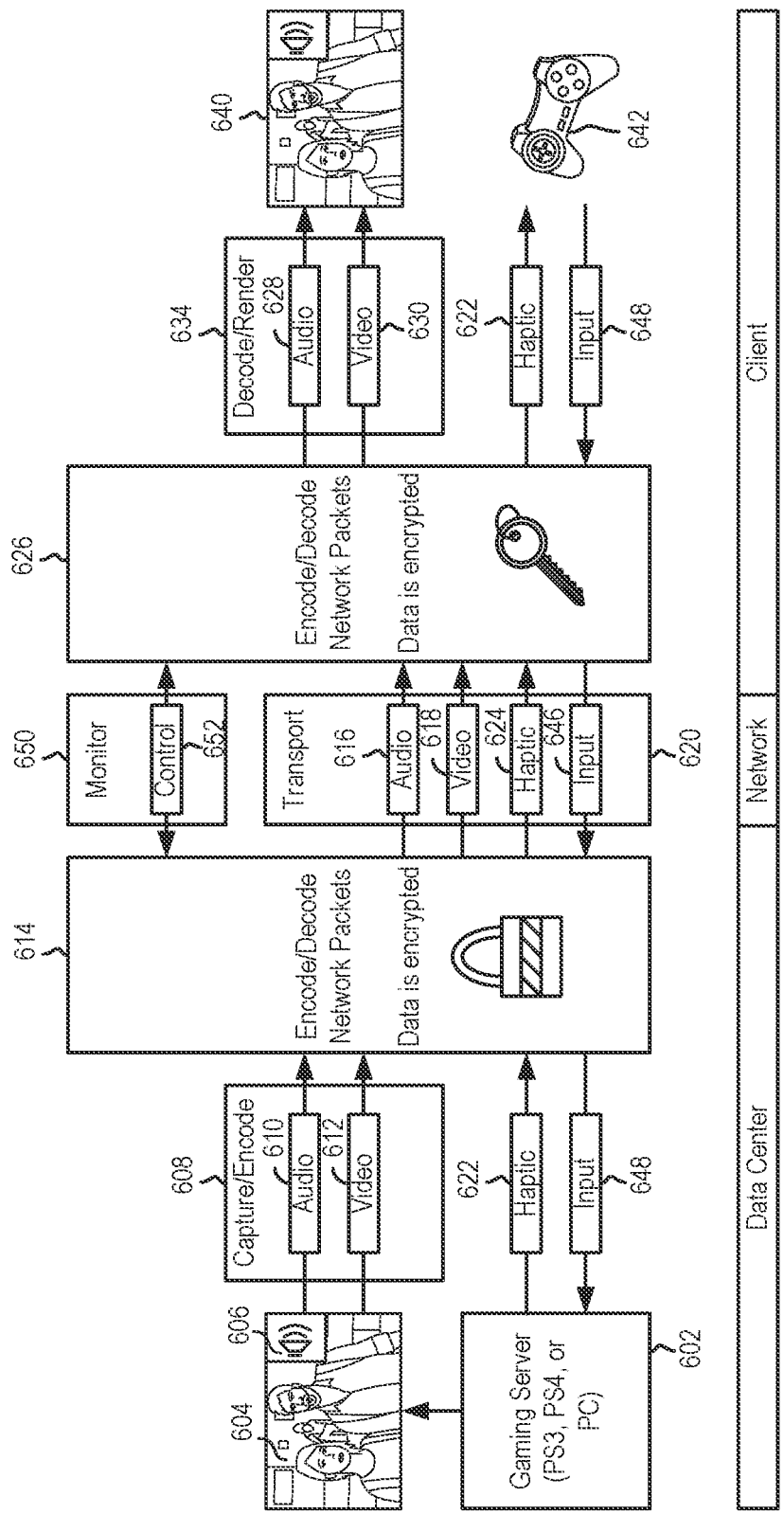
FIG. 6 is a flow diagram conceptually illustrating various operations, which are performed for streaming a cloud video game to a client device, in accordance with implementations of the disclosure.

FIG. 6 is a flow diagram conceptually illustrating various operations which are performed for streaming a cloud video game to a client device, in accordance with implementations of the disclosure. Examples of the client device include a game controller, a smart phone, a game console, and a computer. A game server 602 executes the game program 458 (FIG. 4B), such as a video game, and generates raw (uncompressed) video 604 and audio 606. The virtual scene 202, 230 or 240 (FIGS. 2A-2C) and audio output during presentation of the virtual scene are examples of the video 1004 and audio 606. The game server 602 is an example of the server system 152 (FIG. 1B). The video 604 and audio 606 are captured and encoded for streaming purposes, as indicated at reference 608 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 610 and encoded video 612 are further packetized into network packets, as indicated at reference numeral 614, for purposes of transmission over a computer network 620, which is an example of the computer network 156 (FIG. 1B). In some embodiments, the network packet encoding process also employs a data encryption process, thereby providing enhanced data security. In the illustrated implementation, audio packets 616 and video packets 618 are generated for transport over the computer network 620.

The game server 602 additionally generates haptic feedback data 622, which is also packetized into network packets for network transmission. In the illustrated implementation, haptic feedback packets 624 are generated for transport over the computer network 620.

The foregoing operations of generating the raw video and audio and the haptic feedback data are performed on the game server 602 of a data center, and the operations of encoding the video and audio, and packetizing the encoded audio/video and haptic feedback data for transport are performed by the streaming engine of the data center. As indicated, the audio, video, and haptic feedback packets are transported over the computer network 620. As indicated at reference 626, the audio packets 616, video packets 618, and haptic feedback packets 624, are disintegrated, e.g., parsed, etc., by the client device to extract encoded audio 628, encoded video 630, and haptic feedback data 622 at the client device from the network packets. If data has been encrypted, then the data is also decrypted. The encoded audio 628 and encoded video 630 are then decoded by the client device, as indicated at reference 634, to generate client-side raw audio and video data for rendering on a display device 640 of the client device. The haptic feedback data 622 is processed by a processor of the client device to produce a haptic feedback effect at a controller device 624 or other interface device, e.g., the HMD, etc., through which haptic effects can be rendered. The controller device 624 is an example of a hand-held controller of the client device. One example of a haptic effect is a vibration or rumble of the controller device 624.

It will be appreciated that a video game is responsive to player inputs, and thus, a similar procedural flow to that described above for transmission and processing of player input, but in the reverse direction from client device to server, is performed. As shown, the controller device 624 or another input component, e.g., a body part of the player 1, etc., or a combination thereof generates input data 648. The input data 648 is packetized at the client device for transport over the computer network 620 to the data center. Input data packets 646 are unpacked and reassembled by the game server 602 to define the input data 648 on the data center side. The input data 648 is fed to the game server 602, which processes the input data 648 to generate a game state of the game.

During transport via the computer network 620 of the audio packets 616, the video packets 618, and haptic feedback packets 624, in some embodiments, the transmission of data over the computer network 620 is monitored to ensure a quality of service. For example, network conditions of the computer network 620 are monitored as indicated by reference 650, including both upstream and downstream network bandwidth, and the game streaming is adjusted in response to changes in available bandwidth. That is, the encoding and decoding of network packets is controlled based on present network conditions, as indicated by reference 652.

Figure 7:
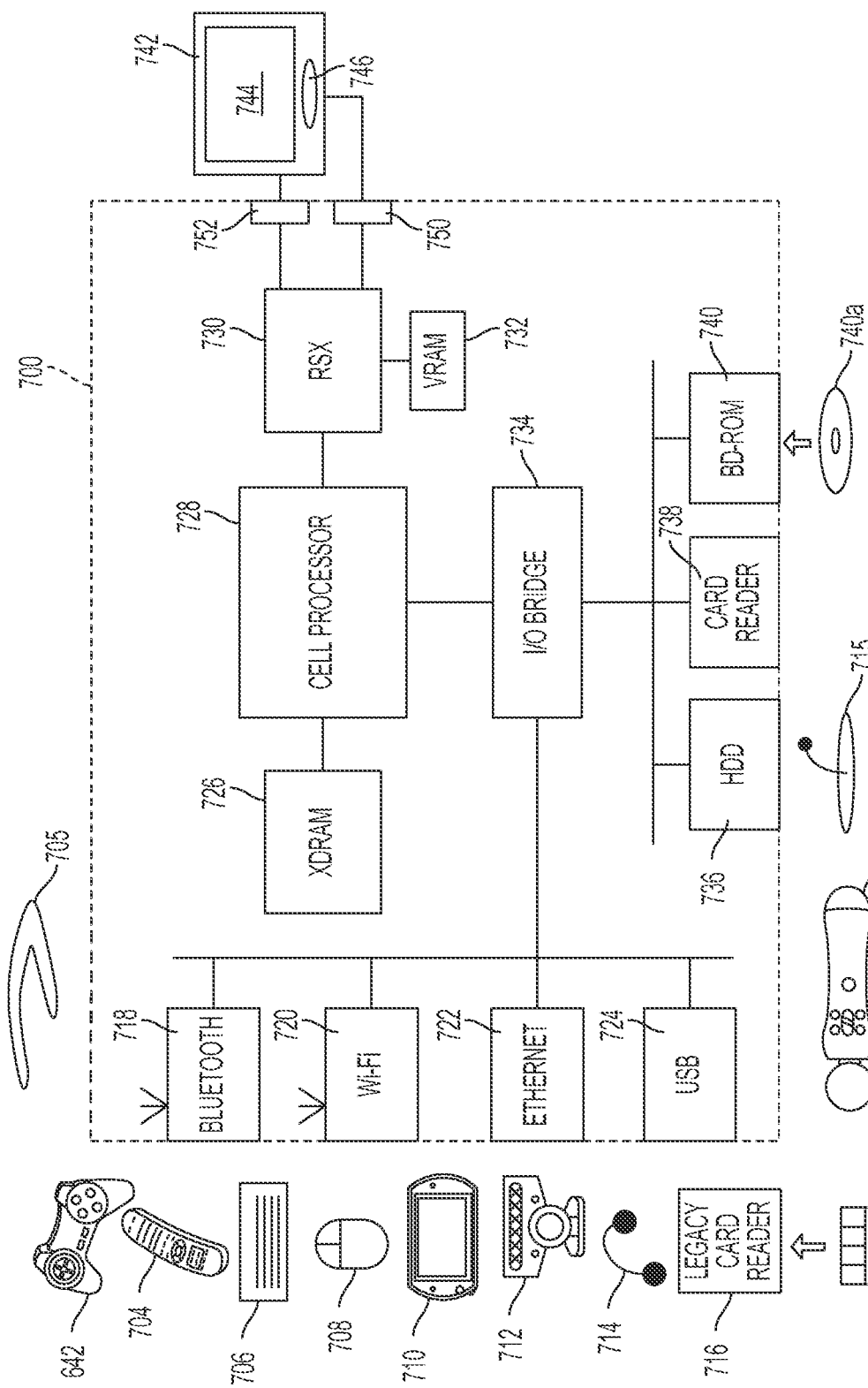
FIG. 7 is a block diagram of an embodiment of a game console that is compatible for interfacing with a display device of a client device and is capable of communicating via the computer network with a game hosting system.

FIG. 7 is a block diagram of an embodiment of a game console 700 that is compatible for interfacing with a display device of a client device and is capable of communicating via the computer network 620 (FIG. 6) with a game hosting system, such as the server system 152 (FIG. 1B). The game console 700 is an example of the game console 452 (FIG. 4B). The game console 700 is located within the data center or is located at a location at which a player, such as the player 1 or 2 or 3 or 4, is located. In some embodiments, the game console 700 is used to execute a game that is displayed on an HMD 705. The game console 700 is provided with various peripheral devices connectable to the game console 700. The game console 700 has a cell processor 728, a dynamic random access memory (XDRAM) unit 726, a Reality Synthesizer graphics processor unit 730 with a dedicated video random access memory (VRAM) unit 732, and an input/output (I/O) bridge 734. The game console 700 also has a Blu Ray® Disk read-only memory (BD-ROM) optical disk reader 740 for reading from a disk 740a and a removable slot-in hard disk drive (HDD) 736, accessible through the I/O bridge 734. Optionally, the game console 700 also includes a memory card reader 738 for reading compact flash memory cards, memory Stick® memory cards and the like, which is similarly accessible through the I/O bridge 734. The I/O bridge 734 also connects to USB 2.0 ports 724, a gigabit Ethernet port 722, an IEEE 802.11b/g wireless network (Wi-Fi™) port 720, and a Bluetooth® wireless link port 718 capable of supporting Bluetooth connections.

In operation, the I/O bridge 734 handles all wireless, USB and Ethernet data, including data from a game controller and from the HMD 705. For example, when a player, such as the player 1 or 2 or 3 or 4, is playing the game generated by execution of a portion of a game code, such as the game program 458 of the game engine 302 (FIG. 4B), the I/O bridge 734 receives input data or an input signal, described herein, from the game controller 642 (FIG. 6) or 703 and/or from the HMD 705 via a Bluetooth link and directs the input data to the cell processor 728, which updates a current state of the game accordingly. As an example, a camera within the HMD 705 captures a gesture of the player 1 to generate an image representing the gesture. The game controller 642 is an example of the hand-held controller 406 (FIG. 4A).

The wireless, USB and Ethernet ports also provide connectivity for other peripheral devices in addition to the game controllers 642 and 703 and the HMD 705, such as, for example, a remote control 704, a keyboard 706, a mouse 708, a portable entertainment device 710, such as, e.g., a Sony Playstation Portable® entertainment device, etc., a video camera, such as, e.g., an EyeToy® video camera 712, etc., a microphone headset 714, and a microphone 715. The portable entertainment device 710 is an example of a game controller. In some embodiments, such peripheral devices are connected to the game console 700 wirelessly, for example, the portable entertainment device 710 communicates via a Wi-Fi™ ad-hoc connection, whilst the microphone headset 714 communicates via a Bluetooth link. The microphone headset 714 is an example of the head phone 408 (FIG. 4A).

The provision of these interfaces means that the game console 700 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 716 is connected to the game console 700 via the USB port 724, enabling the reading of memory cards 748 of a kind used by the game console 700. The game controllers 642 and 703, and the HMD 705 are operable to communicate wirelessly with the game console 700 via the Bluetooth link 718, or to be connected to the USB port 724, thereby also receiving power by which to charge batteries of the game controller 642 and 703 and the HMD 705. In some embodiments, each of the game controllers 642 and 703, and the HMD 705 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 700, and wireless devices using protocols, such as, e.g., Bluetooth, Wi-Fi, etc.

The game controller 642 is a controller designed to be used with two hands by a player, such as the player 1 or 2 or 3 or 4, and the game controller 703 is a single-hand controller with an attachment. The HMD 705 is designed to fit on top of a head and/or in front of eyes of the player. In addition to one or more analog joysticks and conventional control buttons, each game controller 642 and 703 is susceptible to three-dimensional location determination. Similarly, the HMD 705 is susceptible to three-dimensional location determination. Consequently, in some embodiments, gestures and movements by the player that uses the game controller 642 and 703 and of the HMD 705 are translated as inputs to a game in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 704 is also operable to communicate wirelessly with the game console 700 via the Bluetooth link 718. The remote control 704 includes controls suitable for the operation of the Blu Ray™ Disk BD-ROM reader 740 and for navigation of disk content.

The Blu Ray™ Disk BD-ROM reader 740 is operable to read CD-ROMs compatible with the game console 700, in addition to conventional pre-recorded and recordable CDs, and so-called Super Audio CDs. The Blu Ray™ Disk BD-ROM reader 740 is also operable to read digital video disk-ROMs (DVD-ROMs) compatible with the game console 700, in addition to conventional pre-recorded and recordable DVDs. The Blu Ray™ Disk BD-ROM reader 740 is further operable to read BD-ROMs compatible with the game console 700, as well as conventional pre-recorded and recordable Blu-Ray Disks.

The game console 700 is operable to supply audio and video, either generated or decoded via the Reality Synthesizer graphics unit 730, through audio connectors 750 and video connectors 752 to a display and sound output device 742, such as, e.g., a monitor or television set, etc., having a display screen 744 and one or more loudspeakers 746, or to supply the audio and video via the Bluetooth® wireless link port 718 to the display device of the HMD 705. The audio connectors 750, in various embodiments, include conventional analogue and digital outputs whilst the video connectors 752 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 708. An operating system of the game console 700 supports Dolby® 5.1 surround sound, Dolby® Theatre Surround (DTS), and the decoding of 7.1 surround sound from Blu-Ray® disks. The display and sound output device 742 is an example of the display device 1 of the client device 1 (FIG. 1).

In some embodiments, a video camera, e.g., the video camera 712, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 700. An LED indicator of the video camera 712 is arranged to illuminate in response to appropriate control data from the game console 700, for example, to signify adverse lighting conditions, etc. Some embodiments of the video camera 712 connect to the game console 700 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 700, an appropriate piece of software, such as, a device driver, etc., is provided.

In some embodiments, the aforementioned system devices, including the game console 700, the game controller 642 (FIG. 6) or 703, and the HMD 705 enable the HMD 705 to display and capture video of an interactive session of the game. The system devices initiate an interactive session of the game, the interactive session defining interactivity between the player 1 and other players and the game. The system devices further determine an initial position and orientation of the game controller 642 (FIG. 6) or 703, and/or the HMD 705 operated by a player, such as the player 1, or 2, or 3, or 4. The game console 700 determines a current state of a game based on the interactivity between a player, such as the player 1, or 2, or 3, or 4, and the game. The system devices track a position and orientation of the game controller 642 (FIG. 6) or 703 and/or the HMD 705 during an interactive session of a player, such as the player 1, or 2, or 3, or 4, with a game. The system devices generate a spectator video stream of the interactive session based on a current state of a game and the tracked position and orientation of the HHC and/or the HMD 705. In some embodiments, the HHC renders the spectator video stream on a display screen of the HHC. In various embodiments, the HMD 705 renders the spectator video stream on a display screen of the HMD 705.

Figure 8:
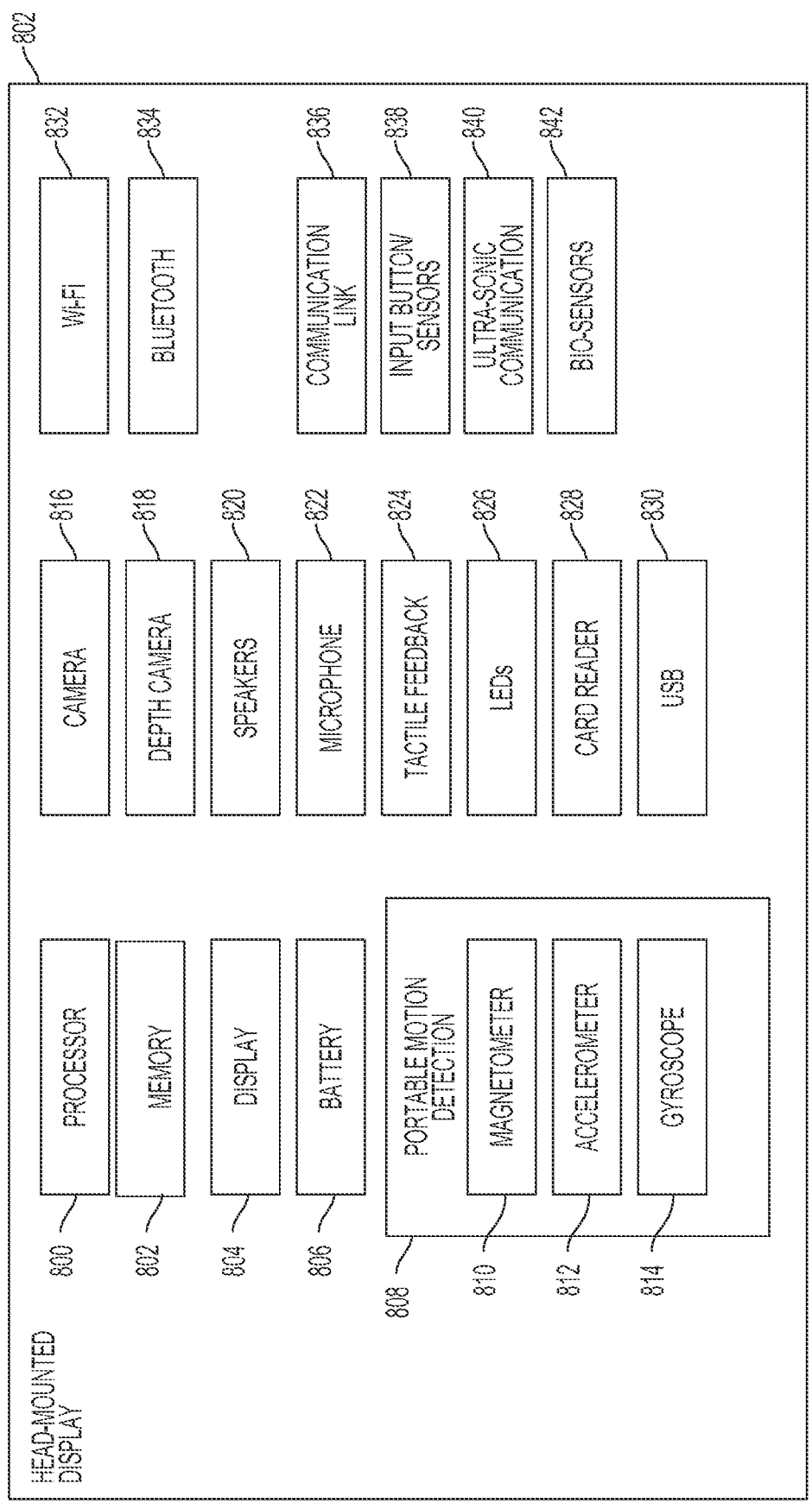
FIG. 8 is a diagram illustrating components of a head-mounted display (HMD).

With reference to FIG. 8, a diagram illustrating components of an HMD 802 is shown. The HMD 802 is an example of the HMD 705 (FIG. 7). The HMD 802 includes a processor 800 for executing program instructions. A memory device 802 is provided for storage purposes. Examples of the memory device 802 include a volatile memory, a non-volatile memory, or a combination thereof. A display device 804 is included which provides a visual interface, e.g., display of image frames generated from save data, etc., that any player, such as the player 1, or 2, or 3, or 4, views. A battery 806 is provided as a power source for the HMD 802. A motion detection module 808 includes any of various kinds of motion sensitive hardware, such as a magnetometer 810, an accelerometer 812, and a gyroscope 814.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 812 are used to provide the direction of gravity, which gives an absolute reference for two angles, e.g., world-space pitch and world-space roll, etc.

A magnetometer measures a strength and a direction of a magnetic field in a vicinity of the HMD 802. In some embodiments, three magnetometers 810 are used within the HMD 802, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 814, a camera 816, etc. In one embodiment, the accelerometer 812 is used together with magnetometer 810 to obtain the inclination and azimuth of the HMD 802.

A gyroscope is a device for measuring or maintaining orientation, based on the principles of angular momentum. In one embodiment, instead of the gyroscope 814, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 816 is provided for capturing images and image streams of the real-world environment, e.g., room, cabin, natural environment, etc., surrounding any of players 1, 2, 3 and 4. In various embodiments, more than one camera is included in the HMD 802, including a camera that is rear-facing, e.g., directed away from a player, such as the player 1, or 2, or 3, or 4, when the player is viewing the display of the HMD 802, etc., and a camera that is front-facing, e.g., directed towards the player when the player is viewing the display of the HMD 802, etc. Additionally, in several embodiments, a depth camera 818 is included in the HMD 802 for sensing depth information of objects in the real-world environment.

The HMD 802 includes speakers 820 for providing audio output. Also, a microphone 822 is included, in some embodiments, for capturing audio from the real-world environment, including sounds from an ambient environment, and speech made by the player, etc. The HMD 802 includes a tactile feedback module 824, e.g., a vibration device, etc., for providing tactile feedback to the player. In one embodiment, the tactile feedback module 824 is capable of causing movement and/or vibration of the HMD 802 to provide tactile feedback to the player.

LEDs 826 are provided as visual indicators of statuses of the HMD 802. For example, an LED may indicate battery level, power on, etc. A card reader 828 is provided to enable the HMD 802 to read and write information to and from a memory card. A USB interface 830 is included as one example of an interface for enabling connection of peripheral devices, or connection to other devices, such as other portable devices, computers, etc. In various embodiments of the HMD 802, any of various kinds of interfaces may be included to enable greater connectivity of the HMD 802.

A Wi-Fi™ module 832 is included for enabling connection to the Internet via wireless networking technologies. Also, the HMD 802 includes a Bluetooth™ module 834 for enabling wireless connection to other devices. A communications link 836 is also included, in some embodiments, for connection to other devices. In one embodiment, the communications link 836 utilizes infrared transmission for wireless communication. In other embodiments, the communications link 836 utilizes any of various wireless or wired transmission protocols for communication with other devices.

Input buttons/sensors 838 are included to provide an input interface for the player. Any of various kinds of input interfaces are included, such as buttons, touchpad, joystick, trackball, etc. An ultra-sonic communication module 840 is included, in various embodiments, in the HMD 802 for facilitating communication with other devices via ultrasonic technologies.

Bio-sensors 842 are included to enable detection of physiological data from the player. In one embodiment, the bio-sensors 842 include one or more dry electrodes for detecting bio-electric signals of the player, through the player's skin.

The foregoing components of HMD 802 have been described as merely exemplary components that may be included in HMD 802. In various embodiments, the HMD 802 includes or does not include some of the various aforementioned components.

Figure 9:
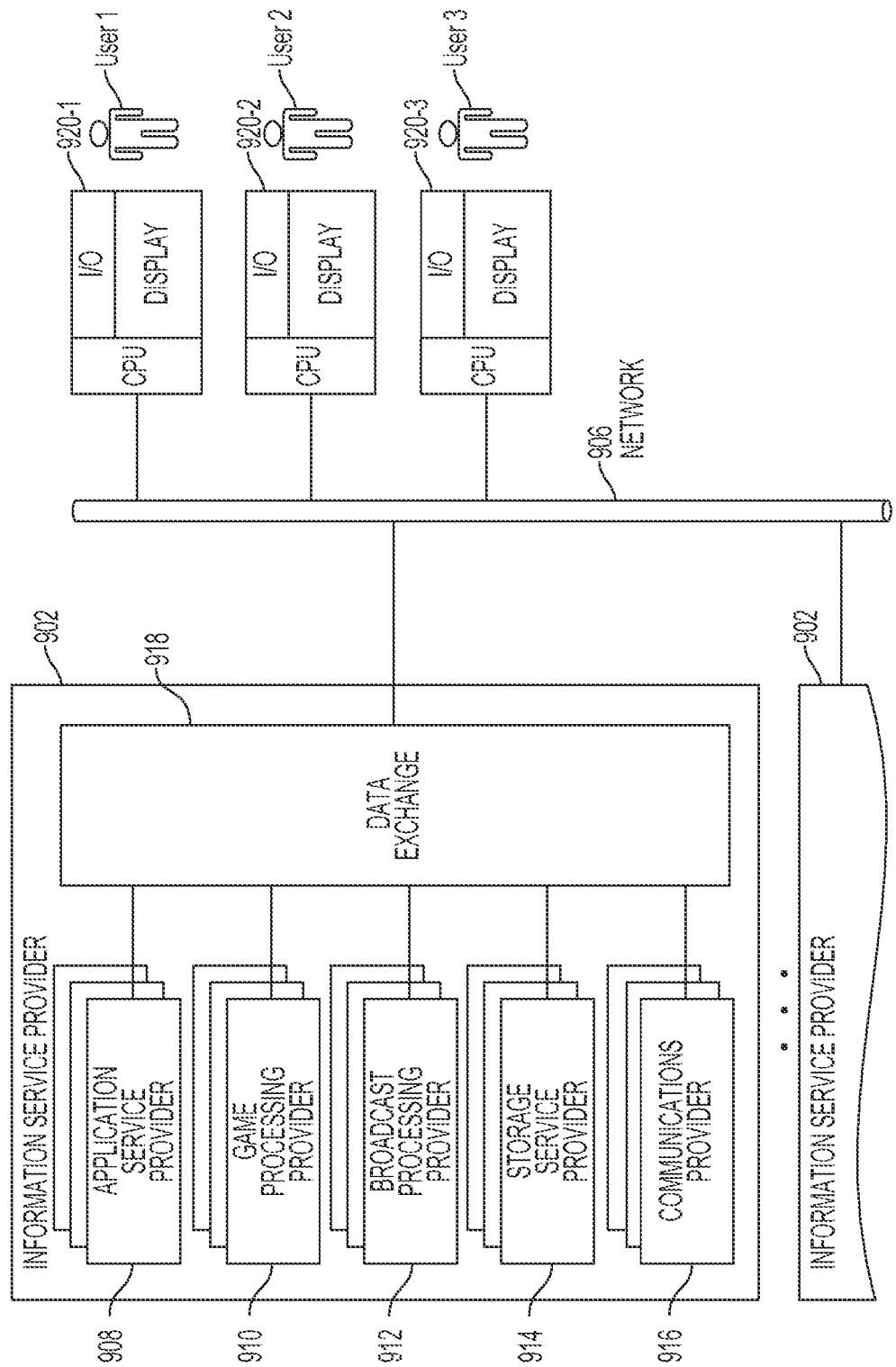
FIG. 9 illustrates an embodiment of an Information Service Provider (INSP) architecture.

FIG. 9 illustrates an embodiment of an Information Service Provider (INSP) architecture. INSPs 902 delivers a multitude of information services to a player, such as the player 1, or 2, or 3, or 4, geographically dispersed and connected via a computer network 906, e.g., a LAN, a WAN, or a combination thereof, etc. The computer network 906 is an example of the computer network 156 (FIG. 1B). An example of the WAN includes the Internet and an example of the LAN includes an Intranet. The player 1, such as a user 1, operates a client device 920-1, the player 2, such as a user 2, operates another client device 920-2, and the player 3, such as a user 3, operates yet another client device 920-3. The client device 920-1 is an example of the client device 1 (FIG. 1B), the client device 920-2 is an example of the client device 2 (FIG. 1B), and the client device 920-3 is an example of the client device 3 (FIG. 1B).

In some embodiments, each client device 920-1, 920-2, and 920-3 includes a central processing unit (CPU), a display, and an input/output (I/O) interface. Examples of each client device 920-1, 920-2, and 920-3 include a personal computer (PC), a mobile phone, a netbook, a tablet, a gaming system, a personal digital assistant (PDA), the game console 700 and a display device, the HMD 802 (FIG. 8), the game console 700 and the HMD 802, a desktop computer, a laptop computer, and a smart television, etc. In some embodiments, the INSP 902 recognizes a type of a client device and adjusts a communication method employed.

In some embodiments, an INSP 902 delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 920-1 is served by an INSP in near proximity to the client device 920-1 while the client device 920-1 is in a home town of the player, and client device 920-1 is served by a different INSP when the player travels to a different city. The home-town INSP will transfer requested information and data to the new INSP, such that the information "follows" the client device 920-1 to the new city making the data closer to the client device 920-1 and easier to access. In various embodiments, a master-server relationship is established between a master INSP, which manages the information for the client device 920-1, and a server INSP that interfaces directly with the client device 920-1 under control from the master INSP. In some embodiments, data is transferred from one ISP to another ISP as the client device 920-1 moves around the world to make the INSP in better position to service client device 920-1 be the one that delivers these services.

The INSP 902 includes an Application Service Provider (ASP) 908, which provides computer-based services to customers over the computer network 906. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 920-1, 920-2, and 920-3 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 906. The users 1 through 3 do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 906, e.g., using servers, storage and logic, etc., based on how the computer network 906 is depicted in computer network diagrams and is an abstraction for the complex infrastructure it conceals.

Further, the INSP 902 includes a game processing provider (GPP) 910, also sometime referred to herein as a game processing server, which is used by the client devices 920-1, 920-2, and 920-3 to play single and multiplayer video games. Most video games played over the computer network 906 operate via a connection to a game server. Typically, games use a dedicated server application that collects data from the client devices 920-1, 920-2, and 920-3 and distributes it to other clients that are operated by other users. This is more efficient and effective than a peer-to-peer arrangement, but a separate server is used to host the server application. In some embodiments, the GPP 910 establishes communication between the client devices 920-1, 920-2, and 920-3, which exchange information without further relying on the centralized GPP 910.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 912, sometimes referred to herein as a broadcast processing provider, distributes audio or video signals to an audience. Broadcasting to a very narrow range of audience is sometimes called narrowcasting. A final leg of broadcast distribution is how a signal gets to the client devices 920-1, 920-2, and 920-3, and the signal, in some embodiments, is distributed over the air as with a radio station or a television station to an antenna and receiver, or through a cable television or cable radio or "wireless cable" via the station. The computer network 906 also brings, in various embodiments, either radio or television signals to the client devices 920-1, 920-2, and 920-3, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 914 provides computer storage space and related management services. The SSP 914 also offers periodic backup and archiving. By offering storage as a service, the client devices 920-1, 920-2, and 920-3 use more storage compared to when storage is not used as a service. Another major advantage is that the SSP 914 includes backup services and the client devices 920-1, 920-2, and 920-3 will not lose data if their hard drives fail. Further, a plurality of SSPs, in some embodiments, have total or partial copies of the data received from the client devices 920-1, 920-2, and 920-3, allowing the client devices 920-1, 920-2, and 920-3 to access data in an efficient way independently of where the client devices 920-1, 920-2, and 920-3 are located or of types of the clients. For example, the player accesses personal files via a home computer, as well as via a mobile phone while the player is on the move.

A communications provider 916 provides connectivity to the client devices 920-1, 920-2, and 920-3. One kind of the communications provider 916 is an Internet service provider (ISP), which offers access to the computer network 906. The ISP connects the client devices 920-1, 920-2, and 920-3 using a data transmission technology appropriate for delivering Internet Protocol datagrams, such as dial-up, digital subscriber line (DSL), cable modem, fiber, wireless or dedicated high-speed interconnects. The communications provider 916 also provides, in some embodiments, messaging services, such as e-mail, instant messaging, and short message service (SMS) texting. Another type of a communications Provider is a network service provider (NSP), which sells bandwidth or network access by providing direct backbone access to the computer network 906. Examples of network service providers include telecommunications companies, data carriers, wireless communications providers, Internet service providers, cable television operators offering high-speed Internet access, etc.

A data exchange 918 interconnects the several modules inside INSP 602 and connects these modules to the client devices 920-1, 920-2, and 920-3 via the computer network 906. The data exchange 918 covers, in various embodiments, a small area where all the modules of INSP 902 are in close proximity, or covers a large geographic area when the different modules are geographically dispersed. For example, the data exchange 902 includes a fast Gigabit Ethernet within a cabinet of a data center, or an intercontinental virtual LAN.

In some embodiments, communication between the server system 152 and the client devices 920-1 through 920-3 may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog-to-digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for verifying online behavior associated with play of a game, comprising:
receiving a characterization of a first game player as being praiseworthy, wherein the first game player is assigned a first user account, wherein the characterization is received from a second user account of a second game player;
recording the online behavior received via the first user account of the first game player, wherein the online behavior occurs towards the second game player via the second user account of the second game player and occurs towards additional game players via additional user accounts of the additional game players, wherein the recording of the online behavior occurs after receiving the characterization from the second user account of the second game player;
accessing the recording of the online behavior of the first game player;
analyzing, by using an artificial intelligence (AI) model, the online behavior of the first game player to determine whether the characterization as being praiseworthy is accurate, wherein said analyzing the online behavior is performed based on the recording of the online behavior of the first game player; and
implementing an online action directed towards the first game player upon determining that the characterization of the first game player as being praiseworthy is accurate.

2. The method of claim 1, wherein the online behavior is analyzed based on a number of chat comments made by the first game player during the play of the game regarding the second game player and the additional game players, or a profile of the first game player, or help from the first game player to the second game player and the additional game players during the play of the game, or a number of instances of report of the praiseworthy conduct by the additional game players or a combination thereof.

3. The method of claim 1, further comprising:
receiving a characterization of the first game player as being abusive from a third user account of a third game player,
recording additional online behavior of the first game player towards the third game player and the additional game players after receiving the characterization from the user account of the third game player.

4. The method of claim 3, wherein said analyzing the online behavior is performed based on the recording of the additional online behavior.

5. The method of claim 4, wherein said analyzing the online behavior includes analyzing the additional online behavior, wherein said analyzing the online behavior occurs to determine whether a first probability that the online behavior is praiseworthy is greater than to a second probability that the online behavior is abusive, wherein the determination that the characterization of the first game player as being praiseworthy is accurate is made upon determining that the first probability is greater than the second probability.

6. The method of claim 1, wherein the AI model is trained based on the online behavior.

7. The method of claim 1, wherein said implementing the online action directed towards the first game player includes providing virtual points to the first user account assigned to the first game player.

8. A server for verifying online behavior associated with play of a game, comprising:
a processor configured to:
receive a characterization of a first game player as being praiseworthy, wherein the first game player is assigned a first user account, wherein the characterization is received from a second user account of a second game player;
record the online behavior received via the first user account of the first game player, wherein the online behavior occurs towards the second game player via the second user account of the second game player and occurs towards additional game players via additional user accounts of the additional game players, wherein the recording of the online behavior occurs after the characterization is received from the second user account of the second game player;
access the recording of the online behavior of the first game player;
analyze, by using an artificial intelligence (AI) model, the online behavior of the first game player to determine whether the characterization as being praiseworthy is accurate, wherein the online behavior is analyzed based on the recording of the online behavior of the first game player; and
implement an online action directed towards the first game player when it is determined that the characterization of the first game player as being praiseworthy is accurate; and
a memory device coupled to the processor.

9. The server of claim 8, wherein the online behavior is analyzed based on a number of chat comments made by the first game player during the play of the game regarding the second game player and the additional game players, or a profile of the first game player, or help from the first game player to the second game player and the additional game players during the play of the game, or a number of instances of report of the praiseworthy conduct by the additional game players or a combination thereof.

10. The server of claim 8, wherein the processor is configured to:
receive a characterization of the first game player as being abusive from a third user account of a third game player,
record additional online behavior of the first game player towards the third game player and the additional game players after receiving the characterization from the third user account of the third game player.

11. The server of claim 10, wherein the online behavior is analyzed based on the recording of the additional online behavior.

12. The server of claim 11, wherein the online behavior is analyzed to determine whether a first probability that the online behavior is praiseworthy is greater than to a second probability that the online behavior is abusive, wherein the determination that the characterization of the first game player as being praiseworthy is accurate is made when it is determined that the first probability is greater than the second probability.

13. The server of claim 8, wherein the AI model is trained based on the online behavior.

14. The server of claim 8, wherein to implement the online action directed towards the first game player, the processor is configured to provide virtual points to the first user account assigned to the first game player.

15. A non-transitory computer-readable medium containing program instructions for verifying online behavior associated with play of a game, wherein execution of the program instructions by one or more processors of a computer system causes the one or more processors to carry out operations of:
receiving a characterization of a first game player as being praiseworthy, wherein the first game player is assigned a first user account, wherein the characterization is received from a second user account of a second game player;
recording the online behavior, including gameplay behavior, received via the first user account of the first game player, wherein the online behavior occurs towards the second game player via the second user account of the second game player and occurs towards additional game players via additional user accounts of the additional game players, wherein the recording of the online behavior occurs after receiving the characterization from the second user account of the second game player;
accessing the recording of the online behavior of the first game player;
analyzing, by using an artificial intelligence (AI) model, the online behavior of the first game player to determine whether the characterization as being praiseworthy is accurate, wherein said analyzing the online behavior is performed based on the recording of the online behavior of the first game player; and
implementing an online action directed towards the first game player upon determining that the characterization of the first game player as being praiseworthy is accurate.

16. The non-transitory computer-readable medium of claim 15, wherein the online behavior is analyzed based on a number of chat comments made by the first game player during the play of the game regarding the second game player and the additional game players, or a profile of the first game player, or help from the first game player to the second game player and the additional game players during the play of the game, or a number of instances of report of the praiseworthy conduct by the additional game players or a combination thereof.

17. The non-transitory computer-readable medium of claim 15, further comprising:
receiving a characterization of the first game player as being abusive from a third user account of a third game player,
recording additional online behavior of the first game player towards the third game player and the additional game players after receiving the characterization from the third user account of the third game player.

18. The non-transitory computer-readable medium of claim 17, wherein said analyzing the online behavior is performed based on the recording of the additional online behavior.

19. The non-transitory computer-readable medium of claim 18, wherein said analyzing the online behavior includes analyzing the additional online behavior, wherein said analyzing the online behavior occurs to determine whether a first probability that the online behavior is praiseworthy is greater than to a second probability that the online behavior is abusive, wherein the determination that the characterization of the first game player as being praiseworthy is accurate is made upon determining that the first probability is greater than the second probability.

20. The non-transitory computer-readable medium of claim 17, wherein the AI model is trained based on the online behavior.

\* \* \* \* \*